US012783325B1

(12) United States Patent
Emami-Nemini et al.

(10) Patent No.: US 12,783,325 B1
(45) Date of Patent: Nov. 3, 2026

(54) SYSTEMS AND METHODS FOR SECURE MULTI-STAGE ENTITY RESOLUTION

(71) Applicant: Veeva Systems Inc., Pleasanton, CA (US)

(72) Inventors: Alexander Darius Emami-Nemini, Frankfurt (DE); Reza Karimi, Amsterdam (NL); Naemi Katharina Lehmann, Planegg (DE); Peter Tauter, Berlin (DE)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/573,148

(22) Filed: Mar. 20, 2026

Related U.S. Application Data

(63) Continuation-in-part of application No. 19/410,231, filed on Dec. 5, 2025.

(51) Int. Cl.
*G06F 9/50* (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS 10,388,274 B1 8/2019 Hoffmeister
10,963,497 B1 3/2021 Tablan et al.
12,235,814 B1 * 2/2025 Al-Shehab ............ G06F 16/215
12,321,330 B1 * 6/2025 Berlinic ................ G06F 16/215
12,353,441 B1 * 7/2025 Zhao ..................... G06F 16/285
12,417,250 B1 9/2025 Sharma et al.
12,627,659 B1 * 5/2026 Gorman .............. H04L 63/0861
2015/0161202 A1 6/2015 Shapira et al.
2017/0083606 A1 3/2017 Mohan
2017/0103335 A1 * 4/2017 Oi ............................ G06N 7/01
2021/0049348 A1 * 2/2021 Qureshi ............... G06V 40/165
2021/0064698 A1 * 3/2021 Simanovich .......... G06F 16/334
2021/0073662 A1 * 3/2021 Lokhande ................ G06N 5/04
(Continued)

OTHER PUBLICATIONS

Sravan Kumar Kunadi; "Entity Resolution at Scale: Advanced Fuzzy Matching Techniques for Company and Project Data"; IJRPETM 2023; DOI:10.15662/IJRPETM.2023.0601003; (Kunadi_2023.pdf) (Year: 2023).*

*Primary Examiner* — Hiren P Patel

(57) ABSTRACT

A method for optimizing computational resources in multi-stage entity resolution via machine learning (ML) and artificial intelligence (AI) includes receiving multiple entity datasets. The method further includes matching the entity datasets using a first ML model to determine two or more first sets of matched entity datasets. The method further includes refining the two or more first sets of matched entity datasets using a second ML model to determine one or more second sets of matched entity datasets and a confidence score for each. The method further includes determining a third plurality of entity datasets based on the confidence scores. The method further includes generating and outputting a request to a partner computing system associated with an AI partner. The method further includes receiving, in response to outputting the request, a response file including one or more third sets of matched entity datasets.

16 Claims, 6 Drawing Sheets

(56) References Cited

U.S. PATENT DOCUMENTS

| | | | | |
|---|---|---|---|---|
| 2021/0216831 | A1* | 7/2021 | Ben-Itzhak | G06F 18/2155 |
| 2021/0350376 | A1* | 11/2021 | Rosenthal | G06Q 20/4016 |
| 2022/0237383 | A1* | 7/2022 | Park | G06F 40/30 |
| 2022/0253725 | A1* | 8/2022 | Feng | G06N 5/04 |
| 2023/0385390 | A1* | 11/2023 | Krishnagi | G06F 21/316 |
| 2024/0296348 | A1* | 9/2024 | Neumann | G06F 16/3344 |
| 2025/0005058 | A1 | 1/2025 | Khosla et al. | |
| 2025/0200029 | A1* | 6/2025 | Chodankar | G06F 16/215 |
| 2025/0265460 | A1* | 8/2025 | Kanwar | G06N 3/08 |
| 2025/0292323 | A1* | 9/2025 | Chau | G06F 11/3604 |
| 2025/0310413 | A1* | 10/2025 | Jain | G06F 18/2415 |

* cited by examiner

SYSTEMS AND METHODS FOR SECURE MULTI-STAGE ENTITY RESOLUTION

CROSS REFERENCE TO RELATED APPLICATIONS

This application is a continuation-in-part of U.S. patent application Ser. No. 19/410,231, filed on Dec. 5, 2025, which is incorporated herein by reference in its entirety.

TECHNICAL FIELD

The present disclosure relates to systems and methods for secure multi-stage entity resolution.

BACKGROUND

Researchers, scientists, industry players, academics, government regulators, and other stakeholders are increasingly in need of simple ways to intake, process, and securely match datasets.

SUMMARY

One embodiment relates to a method for optimizing computational resources in multi-stage entity resolution via machine learning (ML) and artificial intelligence (AI). The method includes receiving a first plurality of entity datasets from a client computing device. The first plurality of entity datasets are each structured according to a first data structure. The method further includes retrieving a second plurality of entity datasets from a first repository of the computing system. The second plurality of entity datasets are each structured according to a second data structure. The method further includes matching at least one entity dataset of the first plurality of entity datasets to at least one entity dataset of the second plurality of entity datasets using a first ML model to determine two or more first sets of matched entity datasets. The method further includes refining the two or more first sets of matched entity datasets using a second ML model to determine one or more second sets of matched entity datasets and a confidence score associated with each second set. The method further includes determining a third plurality of entity datasets including each entity dataset of one or more second sets of matched entity datasets associated with a confidence score less than a threshold confidence score. The method further includes generating a request including the third plurality of entity datasets, at least one entity dataset of the second plurality of entity datasets, and a key. The method further includes outputting the request to a partner computing system associated with an AI partner. The method further includes receiving, in response to outputting the request, a response file including one or more third sets of matched entity datasets.

Another embodiment relates to a method for optimizing computational resources in multi-stage entity resolution via machine learning (ML) and artificial intelligence (AI). The method includes receiving or retrieving a first plurality of entity datasets. The method further includes receiving or retrieving a second plurality of entity datasets. The method further includes modifying the first plurality of entity datasets to generate a first plurality of vectorized entity datasets. The method further included modifying the second plurality of entity datasets to generate a second plurality of vectorized entity datasets. The method further includes matching at least one vectorized entity dataset of the first plurality of vectorized entity datasets to at least one vectorized entity dataset of the second plurality of vectorized entity datasets using a ML model to determine two or more sets of matched vectorized entity datasets. The method further includes determining a third plurality of entity datasets based on the two or more first sets of matched vectorized entity datasets. The method further includes generating a request including the third plurality of entity datasets and a key. The method further includes outputting the request to a partner computing system associated with an AI partner. The method further includes receiving, in response to outputting the request, a response file including one or more sets of matched entity datasets.

Another embodiment relates to a method for optimizing computational resources in multi-stage entity resolution via machine learning (ML) and artificial intelligence (AI). The method includes receiving or retrieving a first plurality of entity datasets, each entity dataset of the first plurality of entity datasets including at least one entity identifier. The method further includes receiving or retrieving a second plurality of entity datasets, each entity dataset of the second plurality of entity datasets including at least one entity identifier. The method further includes matching at least one entity dataset of the first plurality of entity datasets to at least one entity dataset of the second plurality of entity datasets using a first ML model to determine two or more first sets of matched entity identifiers. The method further includes refining the two or more first sets of matched entity datasets using a second ML model to determine one or more second sets of matched entity identifiers and a confidence score associated with each second set. The method further includes determining a third plurality of entity datasets based on the one or more second sets of matched entity identifiers. The method further includes generating a request including the third plurality of entity datasets and a key. The method further includes outputting the request to a partner computing system. The method further includes receiving, in response to outputting the request, a response file including one or more third sets of matched entity identifiers. The method further includes generating a mapping file including the one or more second sets of matched entity identifiers and the one or more third sets of matched entity identifiers.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
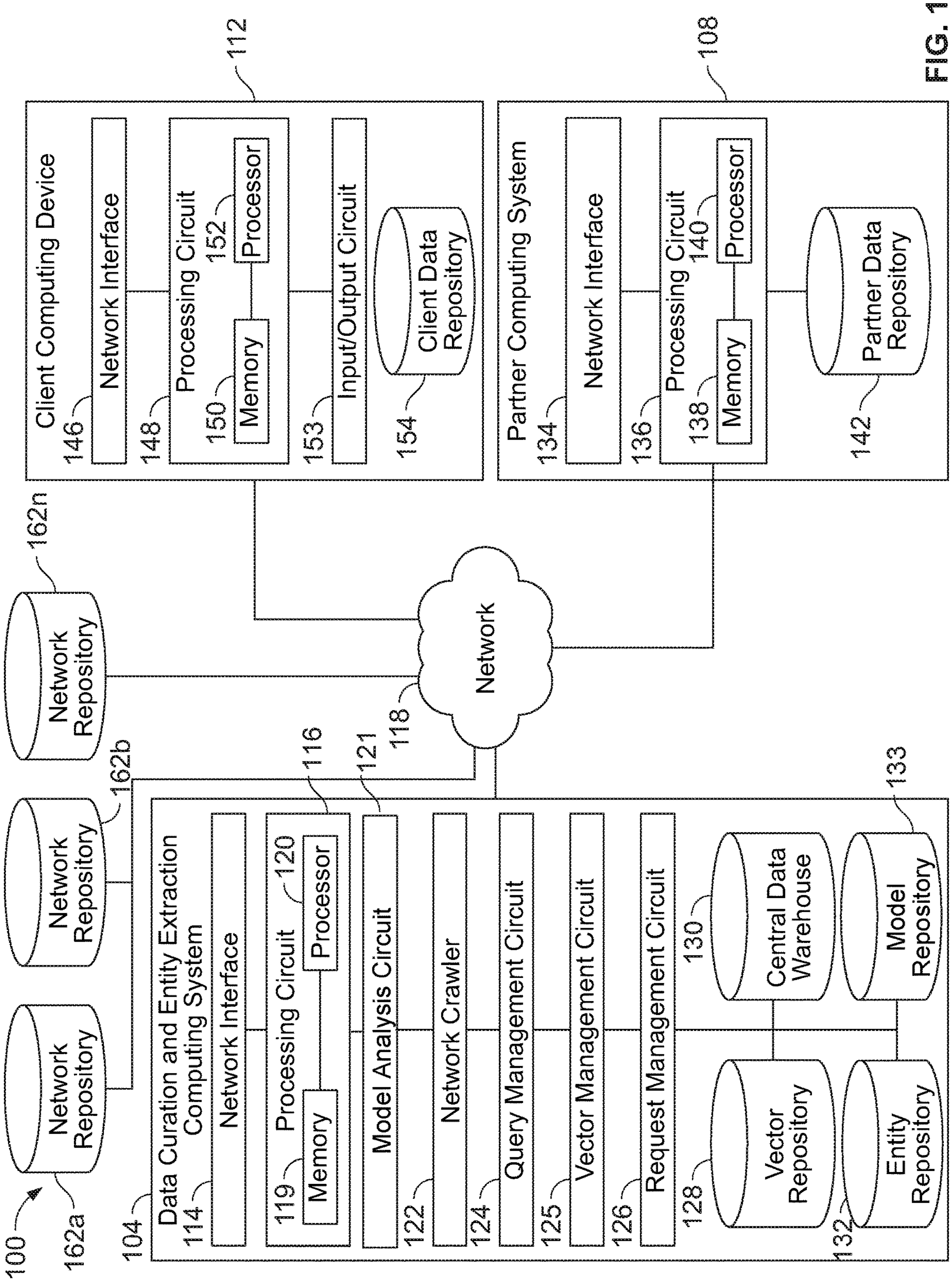
FIG. 1 illustrates an example high level block diagram of an enterprise data curation system, according to an example embodiment.

The present disclosure arises from the realization that high-parameter models like LLMs are computationally expensive due to their complex architectures and attention mechanisms. Utilizing them for every record pair would lead to massive resource underutilization and latency. Referring generally to the figures, systems and methods for secure multi-stage entity resolution described herein provide a technical improvement to data entity resolution algorithms and pipelines by utilizing a multi-stage pipeline that includes specialized machine learning (ML) models and a large language model (LLM) as a high-level tie-breaker. By implementing a tiered execution environment, the system provides a technological solution to the resource-bottleneck of large-scale record matching, which is often computationally intractable due to the high parameter count and attention mechanisms of high-precision models. For instance, because the present systems and methods utilize initial stage ML matching followed by high-precision LLM matching, the present systems provide for optimized precision-recall. For instance, in a typical single-model matching system, there is a trade-off between recall and precision a high-matching threshold results in missed matches (low recall), and a low-matching threshold results in incorrect matches (low precision). In comparison, in the present systems and methods the initial ML stages act as a blocking phase, quickly making the simple matches and discarding of incorrect matches, which is then followed by the LLM which acts as a high-precision filter for the "gray area" cases that usually cause false positives. Accordingly, by utilizing a multi-stage pipeline that includes specialized machine learning (ML) models and a large language model (LLM) as a high-level tie-breaker, the present systems and methods provide a high-recall and high-precision matching which provides for better, more accurate matches overall.

Moreover, by selectively using the LLM on the hardest-to-match candidates, the present systems and methods provide for dynamic resource allocation that alters the computational landscape of the host system, thereby promoting better, more accurate matches, and higher overall computational efficiency. For instance, conventional LLMs are typically the most computationally expensive and costly models to run. Accordingly, running an LLM on every single possible match of a large set of records quickly becomes prohibit expensive and wastes processing power and memory. The present systems and methods overcome the limitations of generic ML applications by utilizing a multi-stage pipeline where the output of a low-latency similarity model (Stage 1) determines whether to invoke a high-latency contextual reasoning model (Stage 3). This specific implementation provides a measurable improvement in computer functionality, reducing the memory footprint and the total number of floating-point operations (FLOPs) required to achieve a validated match across heterogeneous data sources.

Referring now to FIG. 1, an enterprise data curation system 100 is shown, according to an example embodiment. The enterprise may be a business, an organization, or the like. As shown, the system 100 may include a data curation and entity extraction computing system (also referred to as an entity extraction computing system) 104, a partner computing system 108, a client computing device 112, and multiple network repositories 162*a*-162*n*, communicably coupled to each other via a network 118.

The network 118 communicably and operably couples the entity extraction computing system 104, the partner computing system 108, the client computing device 112, and the multiple network repositories 162*a*-162*n* such that communicable and operable computing may be provided between each over the network 118. In various embodiments, the network 118 includes any combination of a local area network (LAN), an intranet, the Internet, or any other suitable communications network, directly or through another interface.

The entity extraction computing system 104 may be operated and managed by a provider (e.g., a software as a service (SaaS)) provider, a cloud services provider, a software provider, a service provider, etc.) and may include a computer system (e.g., one or more servers (e.g., a cloud computing server) each with one or more processing circuits). In some embodiments, the entity extraction computing system 104 may act as a host and provide an application (e.g., a web-based application, a mobile application, etc.) to the client computing devices 112 over the network 118 in response to authenticating the respective computing device 112. For example, entity extraction computing system 104 may receive authentication data (e.g., a username and corresponding password, a limited-use key, a two-factor authentication code or key, etc.) from one the client computing devices 112. The entity extraction computing system 104 may then authenticate the client computing device 112 based on the authentication data and provide an application to the client computing device 112 over the network 118. In some examples, the entity extraction computing system 104 may be a multi-tenant system where various elements of hardware and software may be shared by one or more customers. In a multi-tenant system, a user is typically associated with a particular customer. In one example, a user (e.g., of the client computing device 112) could be an employee of one of a number of (pharmaceutical) companies which are tenants, or customers, of the entity extraction computing system 104.

In some embodiments, the entity extraction computing system 104 may run on a cloud computing platform. Users can access content on the cloud independently by using a virtual machine image or purchasing access to a service maintained by a cloud repository provider.

In some embodiments, the entity extraction computing system 104 may be provided as Software as a Service ("SaaS") to allow users to access the entity extraction computing system 104 with a thin client.

As shown, the entity extraction computing system 104 may include a network interface 114, a processing circuit 116, a model analysis circuit 121, a network crawler 122, a query management circuit 124, a vector management circuit 125, a request management circuit 126, a vector repository 128, a central data warehouse 130, an entity repository 132, and a model repository 133. In some embodiments, the entity extraction computing system 104 may include an input/output circuit (e.g., similar to (e.g., the same as) an input/output circuit 153 as will described further herein).

The network interface 114 is structured to establish connections with the partner computing system 108, the client computing device 112, and the multiple network repositories 162*a*-162*n* by way of the network 118. The network interface 114 includes program logic and/or hardware-based components that connect the provider computing system 104 to the network 118. For example, the network interface 114 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 114 includes the hardware and machine-readable media structured to support communication over multiple channels of data communication. In some embodiments, the network interface 114 includes cryptography logic and capabilities to establish a secure communications session.

The processing circuit 116, as shown, comprises a memory 119 and a processor 120. The memory 119 includes one or more memory devices (e.g., RAM, NVRAM, ROM, flash memory, hard disk storage, etc.) that store data and/or computer code for facilitating the various processes described herein. That is, in operation and use, the memory 119 stores at least portions of instructions and data for execution by the processor 120 to control the processing circuit 116. The memory 119 may be or include tangible, non-transient volatile memory and/or non-volatile memory. The processor 120 may be implemented as a general-purpose processor, an application specific integrated circuit (ASIC), one or more field programmable gate array (FPGAs), a digital signal processor (DSP), a group of processing components or other suitable electronic processing components.

As described herein, the model analysis circuit 121 is a service or circuit structured or configured to determine feature data (e.g., based on the files and entity data records described herein), generate or train a machine learning model based on the feature data, and determine one or more matching entity datasets using the machine learning model. For instance, the model analysis circuit 121 may determine feature data via manual feature selection and ML feature selection. The model analysis circuit 121 may then train or fit the specific digital model to the feature data and store the generated model in the model repository 133. Then, the model analysis circuit 121 may use the ML model to determine matching entity datasets as described with reference to method 400.

As described herein, the network crawler 122 is a service or circuit structured or configured to search and browse the network 118 to index web uniform resource locators (URLs), gather information about web pages on the URLs, and to generate and retrieve web files (as described further herein). The network crawler 122 may continuously repeat a cycle of searching or fetching a URL and visiting the webpage on the URL, parsing the content of the webpage, generating a file (depending on the parse), and extracting new links to visit. In some embodiments, the network crawler 122 first receives a file including a set of seed URLs which are initial web addresses that are manually configured or previously known. In some embodiments, the file including the seed URLs may be received from the partner computing system 108, as described further herein. In other embodiments, the file including the seed URLs may be stored in a repository of the entity extraction computing system 104 (e.g., the central data warehouse 130).

In some embodiments, the entity extraction computing system 104 may receive multiple seed files (e.g., a seed file for each potential entity) and include a network crawler 122 for each seed file. For instance, the entity extraction computing system 104 may receive a first seed file associated with a first potential entity and a second seed file associated with a second potential entity. Accordingly, the entity extraction computing system 104 may deploy two network crawlers 122.

In some embodiments, the network crawler 122 may maintain a queue (e.g., the frontier or URL queue) or other data structure (e.g., a file) which holds all the URLs that have been discovered but not yet parsed or downloaded. The seed URLs are the first items placed in this queue.

In operation, the network crawler 122 selects a URL from the queue, generates and outputs a request (e.g., to a web server associated with the URL, to the network repository (e.g., 162*a*-162*n*) associated with the request, etc.), and receives data in response (e.g., an HTML file including HTML data including text, images, etc.). The network crawler 122 parses the file or data to extract additional URLs included in the data, and to determine if the data is associated with a specific entity (e.g., through natural language process (NLP) or other text analysis techniques.), and as will be described further herein. If the data or HTML file is associated with the specific entity, the network crawler 122 may index the URL (e.g., add the URL to an entity index file) or store the data (e.g., the HTML file) in the central data warehouse 130.

The network crawler 122 may then extract additional URLs by adding URLs of the data to the queue. In some embodiments, the network crawler 122 verifies the URL based on one or more rule criterion (e.g., a specific subdomain in the URL, a specific file type, and other rule criterion described herein). In some embodiments, the network crawler 122 normalizes the URL by converting the URLs into a standard, canonical format (e.g., ensuring consistency in capitalization, removing default port numbers, or resolving relative paths).

The query management circuit 124 is a circuit or service that is configured to generate and manage queries including text queries or prompts. For instance, the query management circuit 124 may be configured to determine a type or classification of the query (e.g., a first type, a second type, a third type, etc.) and generate a query based on the type of the query and one or more sets of data to be included in the query (e.g., an entity vector). For instance, the text query may include a set of pre-selected prompts based on the type of the query. In some embodiments, the query management circuit 124 may include or select a different pre-selected prompt for each query type. In some embodiments, the query management circuit 124 may generate a request including the text query and an API key stored in an API repository (not shown) of the entity extraction computing system 104. The API key is a unique identifier, often a string of alphanumeric characters, used to authenticate and authorize access to an API. It acts like a digital password, allowing applications to identify themselves. In this regard, the query management circuit 124 may determine the API key to include in the request based on the customer associated with the query (e.g., from which the query was received or on behalf of who the query is being generated) and the specific partner computing system to which the request is to be output. In that regard, a customer may have a first API key for a first partner computing system and a second, different, API key for a second partner computing system. In operation, the query management circuit 124 may receive a request to generate the query; generate the query; and output the query to the partner computing system 108.

The vector management circuit 125 is a circuit or service that is configured to generate an entity vector based on one or more files and/or an entity record. As used herein, the term "vector" or "entity vector" as used herein refers to a structured data object that aggregates and organizes information about a specific entity from multiple sources. This structured data object may be formatted, for example, as a JSON (JavaScript Object Notation) object, an XML file, or a similar key-value pair data structure.

This is distinct from a conventional numerical vector embedding, which are referred to herein as "vector embeddings" "vectorized data" or "vectorized entity datasets," which is typically a dense list of floating-point numbers representing the semantic meaning of a piece of text. Instead, the purpose of the structured "entity vector" is to provide a LLM or the partner computing system 108 with a comprehensive, organized, and human-readable profile of the entity, where different facets of information (e.g., publications, affiliations, congress activities) are clearly delineated by keys or tags. This structured format allows the subsequent query template (prompt) to specifically reference different types of information, guiding the LLM's attention to the most relevant data for the user's query and improving the precision of the generated response"

The request management circuit 126 is a circuit or service that is configured to receive requests or text queries and determine a type of the queries based on the text query itself. For instance, the request management circuit 126 may classify the text query based on the text included therein. For instance, in response to the text query including a first specific word/phrase or synonym thereof (e.g., "who is?" "describe" "summarize," etc.), the request management circuit 126 may assign a specific query type to the query (e.g., a first query type or a "general summary" query type). In comparison, in response to the text query including a second specific word/phrase or synonym thereof (e.g., "retrieve documents for," "find trade shows xxx attended," "what is xxx's specialty?" etc.), the request management circuit 126 may assign a specific query type to the query (e.g., a second query type or a "specific fact" query type). In this regard, the request management circuit 126 may determine a type of the query based on the query itself.

In some embodiments, the entity extraction computing system 104 includes an AI model (e.g., neural network model, LLM, etc.) generation circuit or service (not shown) configured to generate, train, and deploy an AI agent or AI model and an AI model execution circuit or service (not shown) configured to execute an AI agent or LLM on the entity extraction computing system 104.

For instance, the AI model generation service (not shown) acts as the development and operational hub for an AI model. In this regard, the AI or LLM generation service may retrieve data from a multitude of sources (e.g., the network repositories 162*a*-162*n* through the network crawler 122, proprietary repositories (not shown) connected via the network 118), etc.) to then initialize and train a base AI model (which could range from a simple, task-specific deep learning model to a large, transformer-based LLM). Further, the AI model generation service may fine-tune the model on large, annotated datasets specifically curated for the task of entity extraction-identifying and classifying key entities (like names, dates, locations, and organizations) within unstructured text. For instance, the AI model generation service may create, receive, or generate curated datasets where entities have been labeled (e.g., Named Entity Recognition (NER) annotation), and then be trained to identify and classify the key entities. Additionally, the AI model generation service may validate the AI model and perform format conversion for efficiency (e.g., quantization), and the establishment of a versioned model endpoint accessible by the execution environment) to ensure consistency. The AI model generation service thereby ensures the models are continuously monitored, updated, and optimized for accuracy and performance.

In comparison, the AI model execution circuit or service (not shown), is the runtime engine where the deployed models perform their primary function. This circuit may be optimized for low-latency inference, as its role is to execute or deploy an AI model on incoming text queries (e.g., prompts) processed by the entity extraction computing system 104 to generate responses. When a document, email, or a block of text is submitted to the system, the execution service loads the appropriate, deployed AI/LLM agent to analyze the text, leveraging its training to pinpoint specific text spans that correspond to predefined entity types. For example, the AI agent may receive a text query requesting data pertaining to a specific entity, and the AI agent may retrieve data associated with the entity and generate a text response associated with the text query. In some embodiments, the AI model execution service may have access to the network 118 to generate text responses. Further, the AI model execution service may be scalable and capable of handling a high volume of requests. For instance, the AI model execution service may employ load balancing and auto-scaling groups to dynamically adjust capacity based on the volume of entity extraction requests. Furthermore, it may perform logging and telemetry of inference results, providing the essential feedback loop to the generation service to monitor model performance and identify potential data drift or degradation in real-world accuracy.

Accordingly, while the present application describes outputting text queries or requests to the partner computing system 108, it should be understood that the entity extraction computing system 104 may locally deploy (e.g., on the same server or processing circuit, on a connected server/processing circuit, etc.) an AI agent or model (via the AI model generation service). The entity extraction computing system 104 may then input or provide the text queries or requests to the AI agent or AI model execution service, which may return a response file.

The vector repository 128 may be a repository (e.g., a database) configured to intake, store, and manage entity vectors. As described herein, the vector management circuit 125 may generate a vector for a specific entity and then store the vector in the vector repository 128. Accordingly, the vector repository 128 can be structured according to various database types, such as, relational, hierarchical, network, flat, point-in time, and/or object relational. In some embodiments, the vector repository 128 include a plurality of nonvolatile/non-transitory storage media such as solid-state storage media, hard disk storage media, virtual storage media, cloud-based storage drives, storage servers, and/or the like.

The central data warehouse 130 may be a data warehouse including one or more repositories (e.g., databases) configured to intake, store, and manage data records and files from a variety of data sources (e.g., the network repositories 162*a*-162*n*). In some embodiments, the files may be matched and/or associated with an entity record of the entity repository 132, as will be described further herein, and then stored in the central data warehouse 130 in association with one another. In some embodiments, the central data warehouse 130 may include a repository for each separate entity. In other embodiments, the central data warehouse 130 may include a repository for each separate customer. In other embodiments, the central data warehouse 130 may include a repository for each file type (or data source of the files). For instance, the central data warehouse 130 may include a publications repository for storing publication files, a social media repository for storing social media files or data, a medical congress repository for storing medical congress files, and so on. Accordingly, the repositories of the central data warehouse 130 can be structured according to various database types, such as, relational, hierarchical, network, flat, point-in time, and/or object relational. In some embodiments, the repositories of the central data warehouse 130 include a plurality of nonvolatile/non-transitory storage media such as solid-state storage media, hard disk storage media, virtual storage media, cloud-based storage drives, storage servers, and/or the like.

The entity repository 132 may be a repository (e.g., a database) that is configured to intake, store, and manage entity data records. The entity data records may be generated or instantiated based on an entity data object and include data associated with a specific entity or person. For instance, the entity repository 132 may store entity data records, where each entity data record is associated with a specific entity, includes data of the specific entity, and is linked to files or URLs associated with the specific entity. Accordingly, the entity repository 132 can be structured according to various database types, such as, relational, hierarchical, network, flat, point-in time, and/or object relational. In some embodiments, the entity repository 132 include a plurality of nonvolatile/non-transitory storage media such as solid-state storage media, hard disk storage media, virtual storage media, cloud-based storage drives, storage servers, and/or the like.

The model repository 133 may be a repository (e.g., a database) that is configured to intake, store, and manage machine learning (ML) models. As described herein, the entity extraction computing system 104 may utilize a variety of digital models including vector matching ML models, classification models, regression models, and the like. As a result, the model repository 133 may receive and store multiple different types of ML models. In some embodiments, the model repository 133 may store feature data associated with each model. In other embodiments, the entity extraction computing system 104 may include a feature data repository (not shown) for storing corresponding feature data. Accordingly, the model repository 133 can be structured according to various database types, such as, relational, hierarchical, network, flat, point-in time, and/or object relational. In some embodiments, the model repository 133 include a plurality of nonvolatile/non-transitory storage media such as solid-state storage media, hard disk storage media, virtual storage media, cloud-based storage drives, storage servers, and/or the like.

Still referring to FIG. 1, the partner computing systems 108 may be managed by third-party partners (e.g., partner company 1, partner company 2, partner computing system xyz, etc.) and can be or include a computing device or system configured to communicate with the entity extraction computing system 104 over the network 118. For instance, the partner computing systems 108 can be a server computer system, a gateway computing system, a laptop computer, a desktop computer, and any other network-connected device that can communicate over the network 118. In another example, one of the partner computing systems 108 may be a laptop computer operated by an employee of a partner company. In another example, one of the partner computing systems 108 may be a server of a LLM partner company (e.g., Google®, OpenAIR, etc.) that receives requests or prompts (e.g., via an application programming interface (API)).

In operation, the partner computing systems 108 may communicate with the entity extraction computing system 104 or the client computing device 112 to send and/or receive one or more electronic communications (e.g., requests, response files, etc.). For instance, the entity extraction computing system 104 may generate a request including a text query, an API key, one or more files, and an entity vector, and output the request to the partner computing system 108. Then, based on the request, the partner computing system 108 may generate a response file or message and output the response file to the entity extraction computing system 104. In some embodiments, the response file may be a specific file type (e.g., Java Script Object Notation (JSON), XML, CSV, etc.).

In some embodiments, the system 100 may include multiple partner computing systems 108 (e.g., a first partner computing system 108, a second partner computing system 108, and so on). In one example, the entity extraction computing system 104 may send different requests out to different partner computing systems 108. For instance, the entity extraction computing system 104 may output a first request to the first partner computing system 108 (which may be associated with a first AI partner (e.g., Google®)). Then, to perform a quality control (QC) check on the response file received from the first partner computing system 108, the entity extraction computing system 104 may generate a second request (including at least a portion of the first response file) and output the second request to a second partner computing system 108 (which may be associated with a second AI partner (e.g., OpenAIR). In this regard, each request may include a different API key (e.g., a first API key and a second API key).

As shown, the partner computing system 108 includes a network interface 134, a processing circuit 136, and a partner repository 142. In other embodiments, each partner computing system 108 includes an API gateway circuit (not shown) for processing API calls and requests. In some embodiments, each partner computing system 108 further includes a key repository (not shown) for storing keys and certificates (e.g., AS2 keys, API keys, etc.).

The network interface 134 is structured to establish connections with the entity extraction computing system 104 and/or the client computing device 112 by way of the network 118. The network interface 134 includes program logic and/or hardware-based components that connect each partner computing system 108 to the network 118. For example, the network interface 134 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 134 includes the hardware and machine-readable media structured to support communication over multiple channels of data communication (e.g., wireless, Bluetooth®, near-field communication (NFC), or the like). In some embodiments, the network interface 134 includes cryptography logic and capabilities to establish a secure communications session.

The processing circuit 136, as shown, comprises a memory 138 and processor 140. The memory 138 includes one or more memory devices (e.g., RAM, NVRAM, ROM, flash memory, hard disk storage, etc.) that store data and/or computer code for facilitating the various processes described herein. That is, in operation and use, the memory 138 stores at least portions of instructions and data for execution by the processor 140 to control the processing circuit 136. The memory 138 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

The partner repository 142 may be similar or the same as the central data warehouse 130 and is a repository (e.g., a database, cloud storage, etc.) that is structured or configured to receive, store, and manage file or data of the partner (e.g., response files, requests, etc.). Further, the partner repository 142 can be structured according to various database types, such as relational, hierarchical, network, flat, point-in time, and/or object relational. In some embodiments, the partner repository 142 includes a plurality of nonvolatile/non-transitory storage media such as solid-state storage media, hard disk storage media, virtual storage media, cloud-based storage drives, storage servers, and/or the like.

Still referring to FIG. 1, the client computing device 112 can each be any type of computing device or computing system. For instance, the client computing device 112 can be one or more of a mobile phone, a tablet computer, a laptop computer, a smart watch, a server computer system, or any other internet-connected device. In some embodiments, the system 100 includes multiple client computing devices 112. In operation, the client computing device 112 may communicate and interface with the entity extraction computing system 104 via the network 118 to generate and/or output a text query. As shown, each client computing device 112 may include a network interface 146, a processing circuit 148, the input/output (I/O) circuit 153, and the client data repository 154.

The network interface 146 is structured to establish connections with the entity extraction computing system 104 by way of the network 118. The network interface 146 includes program logic and/or hardware-based components that connect the client computing device 112 to the network 118. For example, the network interface 146 may include any combination of a wireless network transceiver (e.g., a cellular modem, a broadband modem, a Bluetooth® transceiver, a Wi-Fi® transceiver, a Li-Fi® transceiver, etc.) and/or a wired network transceiver (e.g., an Ethernet transceiver). In some embodiments, the network interface 146 includes the hardware and machine-readable media structured to support communication over multiple channels of data communication (e.g., wireless, Bluetooth®, NFC, and the like). In some embodiments, the network interface 146 includes cryptography logic and capabilities to establish a secure communications session.

The processing circuit 148, as shown, comprises a memory 150 and a processor 152. The memory 150 includes one or more memory devices (e.g., RAM, NVRAM, ROM, flash memory, hard disk storage, etc.) that store data and/or computer code for facilitating the various processes described herein. That is, in operation and use, the memory 150 stores at least portions of instructions and data for execution by the processor 152 to control the processing circuit 148. The memory 150 may be or include tangible, non-transient volatile memory and/or non-volatile memory. The processor 152 may be implemented as a general-purpose processor, an application specific integrated circuit (ASIC), one or more field programmable gate array (FPGAs), a digital signal processor (DSP), a group of processing components or other suitable electronic processing components.

The I/O circuit 153 is structured to receive communications from and provide communications to the user of the client computing device 112 (e.g., the user). In this regard, the I/O circuit 153 is structured to exchange data with the processing circuit 148 to provide output to the user and to receive input from the user. As a result, the I/O circuit 153 may include a display that may be manipulated by the application. In some embodiments, the I/O circuit 153 may also include a keyboard, a mouse, a joystick, a touch screen, touch areas, soft keys, a microphone, a speaker, a vibration mechanism, a sensor, a Radio Frequency Identifier (RFID) scanner, or other input/output devices described herein.

The client repository 154 may be similar or the same as the central data warehouse 130 and is a repository (e.g., a database, cloud storage, etc.) that is structured or configured to receive, store, and manage file or data of the client (e.g., text queries, API keys, etc.). Further, the client repository 154 can be structured according to various database types, such as relational, hierarchical, network, flat, point-in time, and/or object relational. In some embodiments, the client repository 154 includes a plurality of nonvolatile/non-transitory storage media such as solid-state storage media, hard disk storage media, virtual storage media, cloud-based storage drives, storage servers, and/or the like.

Figure 2:
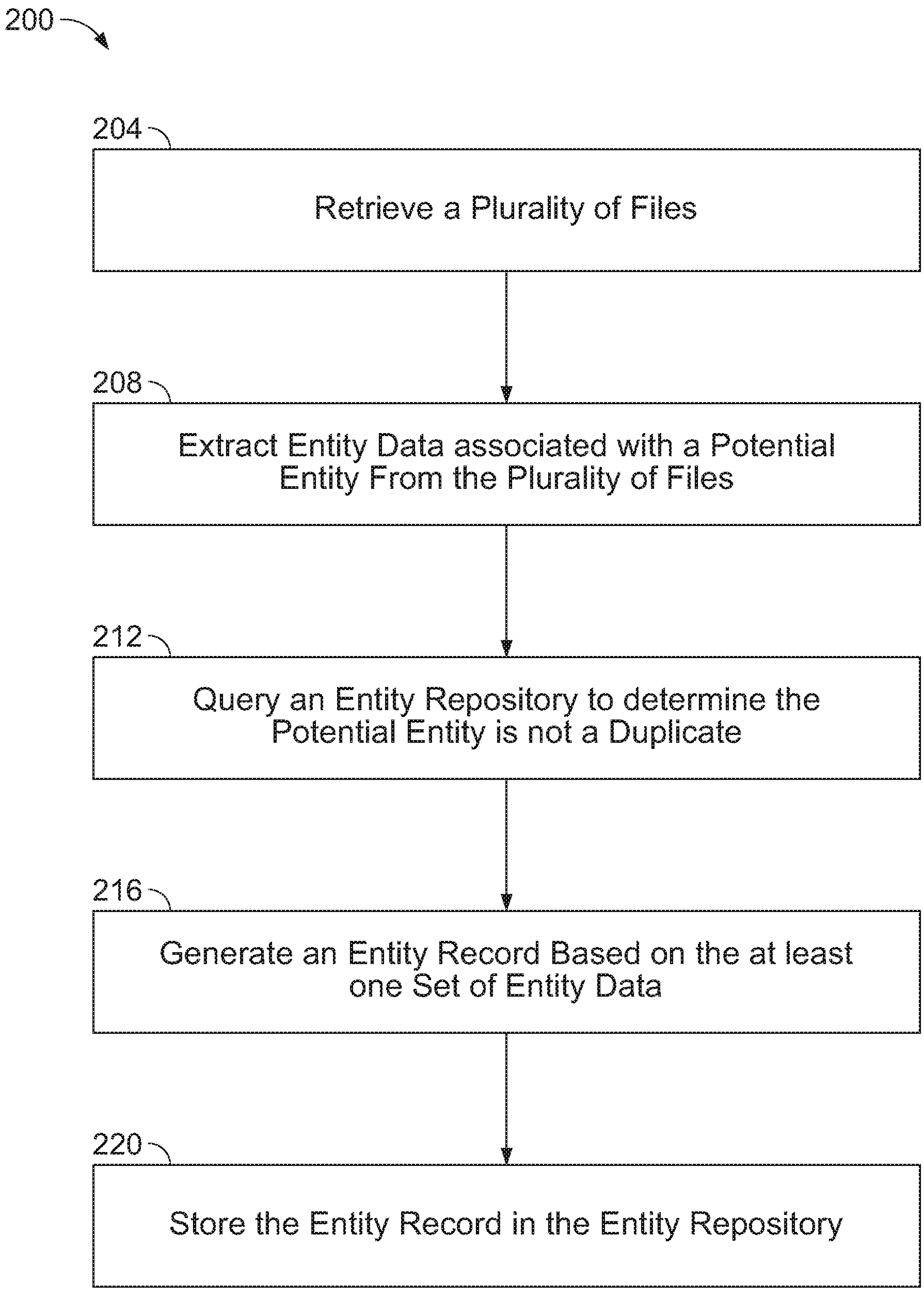
FIG. 2 is a flow diagram of a method for generating an entity data record, according to an example embodiment.

Referring now to FIG. 2, a method 200 of generating or instantiating an entity data record is shown, according to an example embodiment. Method 200 can be carried out by the system of FIG. 1. More particularly, the method 200 can be carried out by the circuits (e.g., the processing circuit 116, the network crawler 122, etc.) of the entity extraction computing system 104 and through communication with the partner computing system 108, the client computing device 112, and/or the network repositories **162*a*-162*n***.

Method 200 commences at step 204 at which the entity extraction computing system 104 receives multiple files. In some embodiments, the files may be web files of different types received or retrieved from the network repositories **162*a*-162*n*** including structure files (e.g., hypertext markup language (HTML) files, extensible markup language (XML) files, etc.), presentation files (e.g., cascading style sheet (CSS) files, etc.), programming files (e.g., JavaScript files, etc.), media files (e.g., image files, video files, etc.), data files (e.g., XML files, JSON files, etc.), and the like. In other embodiments, the files may be other file types (e.g., document files, spreadsheet files, etc.) include a list of potential entities. For instance, the file may be a spreadsheet file (e.g., an Excel file) including a list of provider identifiers (e.g., NPIs).

In some embodiments, the files may be response files received, by the entity extraction computing system 104, from the partner computing system 108. For instance, the entity extraction computing system 104 may generate a request including an API key and/or a text query (e.g., "generate a list of HCP NPI's"). Then, the entity extraction computing system 104 may output the request to the partner computing system 108 and receive the file(s) from the partner computing system 108 in response.

In some embodiments, prior to step 204, the entity extraction computing system 104 may extract entity records from the entity repository 132 and generate a list or entity vector of known entities. Then, the entity extraction computing system 104 may generate a request including an API key, the entity list or vector, and/or a text query (e.g., "generate a list of HCP NPI's that are not identified in the attached list"). Then, the entity extraction computing system 104 may output the request to the partner computing system 108 and receive the file(s) from the partner computing system 108 in response.

In some embodiments, the entity extraction computing system 104 may generate multiple requests and output the requests to multiple partner computing devices 108. For instance, the entity extraction computing system 104 may generate a first request (including a first API key and a first text query) and output the first request to a first partner computing system 108. In response, the entity extraction computing system 104 may receive a first response file including a first list of potential entities. Then, the entity extraction computing system 104 may generate a second request (including a second API key, which is different than the first API key, and the first text query) and output the second request to a second partner computing system (not shown). In response, the entity extraction computing system 104 may receive a second response file including a second list of potential entities. This process may be repeated for each of the multiple partner computing systems (not shown).

Once the entity extraction computing system 104 has received the multiple files, the method 200 proceeds to step 208 at which the entity extraction computing system 104 extracts or determines entity data based on the multiple files. For instance, the entity extraction computing system 104 may determine entity data including an entity identifier (e.g., name, NPI, address), an HCP specialty, a title, an employer, a work address, social media account URL(s) (e.g., a LinkedIn® account URL), and the like. Each set of entity data may be associated with a specific potential entity (e.g., Dr. James Brown, Nurse Practitioner Jesse White, etc.). At step 208, the entity extraction computing system 104 may determine entity data for multiple potential entities. For instance, the entity extraction computing system 104 may determine a set of entity data for each file received at step 204. In another embodiments, the entity extraction computing system 104 may determine multiple sets of entity data for each file received at step 204. Further, the entity extraction computing system 104 may repeat steps 212-220 for each of the multiple potential entities.

To extract the entity data, the entity extraction computing system 104 may parse a specific file values or words that match the fields of the entity data. For instance, the entity extraction computing system 104 may search the specific file for words or terms that correlate to the fields of the entity data (e.g., "NPI", "name", "address", "specialty", and other entity data fields described herein. Then, in response to determining a match, the entity extraction computing system 104 may determine the words directly adjacent to the match. For instance, the file may include the phrase NPI 1234567891. Accordingly, the entity extraction computing system 104 may determine the match of "NPI" and the 10-digit number adjacent to it. In another example, the entity extraction computing system 104 parse the file for a 10-digit number.

In some embodiments, the entity extraction computing system 104 may extract the entity data by generating a request including the file, an API key, and a text query (e.g., "parse the attached document and return each of the following values for a specific HCP: name, national provider identifier, or the like."), and outputting the request to the partner computing system 108. In response, the partner computing system 108 may generate a response file including the entity data and provide the response file to the entity extraction computing system 104.

In some embodiments, if the extracted or determined entity data does not include an entity identifier, the method 200 may not proceed to step 212, and the method 200 may end. For instance, the entity extraction computing system 104 may extract one or more portions of a set of entity data (e.g., specialty, employer, etc.) but the entity identifier. Accordingly, the entity extraction computing system 104 may not proceed with the method 200 without the identifier.

Once the entity extraction computing system 104 has extracted the entity data, the method 200 proceeds to step 212 at which the entity extraction computing system 104 queries the entity repository 132 to determine if the entity data is associated with a duplicate entity. For instance, the entity extraction computing system 104 may query the entity repository 132 for entity records that match the entity identifier. In one example, the entity extraction computing system 104 may extract entity data including a first specific entity identifier (e.g., John Smith), a second entity identifier (e.g., NPI 112211221122), and an HCP specialty (e.g., Cardiologist). Accordingly, the entity extraction computing system 104 may execute a query on the entity repository 132 to search for entity records that include a matching first entity identifier and a matching second entity identifier. In some embodiments, each entity identifier may match for the entity extraction computing system 104 to determine a matching entity data record. In other embodiments, a specific number of fields may match (e.g., one field, two fields, etc.) for the entity extraction computing system 104 to determine a matching entity data record. In other embodiments, for the entity extraction computing system 104 to determine a matching entity data record, the entity identifier and at least one other field may match.

If the entity repository 132 returns a matching entity data record, the entity extraction computing system 104 may combine the entity data and the entity data record. In some embodiments, the entity extraction computing system 104 may only add fields (of the entity data) to the entity data record, in response to the entity data record not having a value for that specific field. For instance, the entity data record may not include an HCP specialty. Accordingly, in response to the matching entity data having an HCP specialty, the entity extraction computing system 104 may combine the entity data and the entity data record by adding the HCP specialty to the entity data record. In some embodiments, the entity extraction computing system 104 may combine the entity data and the entity extraction data record by adding a link (e.g., a URL, a hyperlink, a reference pointer) associated with the file(s) from which the entity data was extracted to the entity data record. The link may provide a direct link or digital connection to the file(s) from which the entity data was extracted or retrieved.

If the entity extraction computing system 104 does not determine a matching entity data record at step 212, the method 200 may proceed to step 216 at which the entity extraction computing system 104 generates an entity data record. The entity extraction computing system 104 may generate the entity data record based on an entity data schema (not shown) which defines the specific fields and related data records of the entity data record. For instance, the entity data schema may indicate each entity data record includes a first name field, a last name field, a NPI field, a specialty field, and the like. Accordingly, to generate the entity data record, the entity extraction computing system 104 may instantiate the entity data record based on the entity data schema and populate the entity data record with the entity data. For instance, the entity extraction computing system 104 may add the NPI of the entity data to the NPI field of the entity data record. Further, for each field of which there is no match in the entity data, the entity extraction computing system 104 may not generate a value or may populate each field with a null or zero value. In some embodiments, step 216 may be skipped and deduplication may be handled via the method 500, as will be described further herein.

Once the entity extraction computing system 104 has generated the entity data record, the method 200 proceeds to step 220 at which the entity extraction computing system 104 stores the generated entity data record in the entity repository 132. In some embodiments, at or after step 220, the entity extraction computing system 104 may output the entity data record (e.g., to the partner computing system 108, to the client computing device 112, to the AI model execution service (not shown), etc.).

Figure 3:
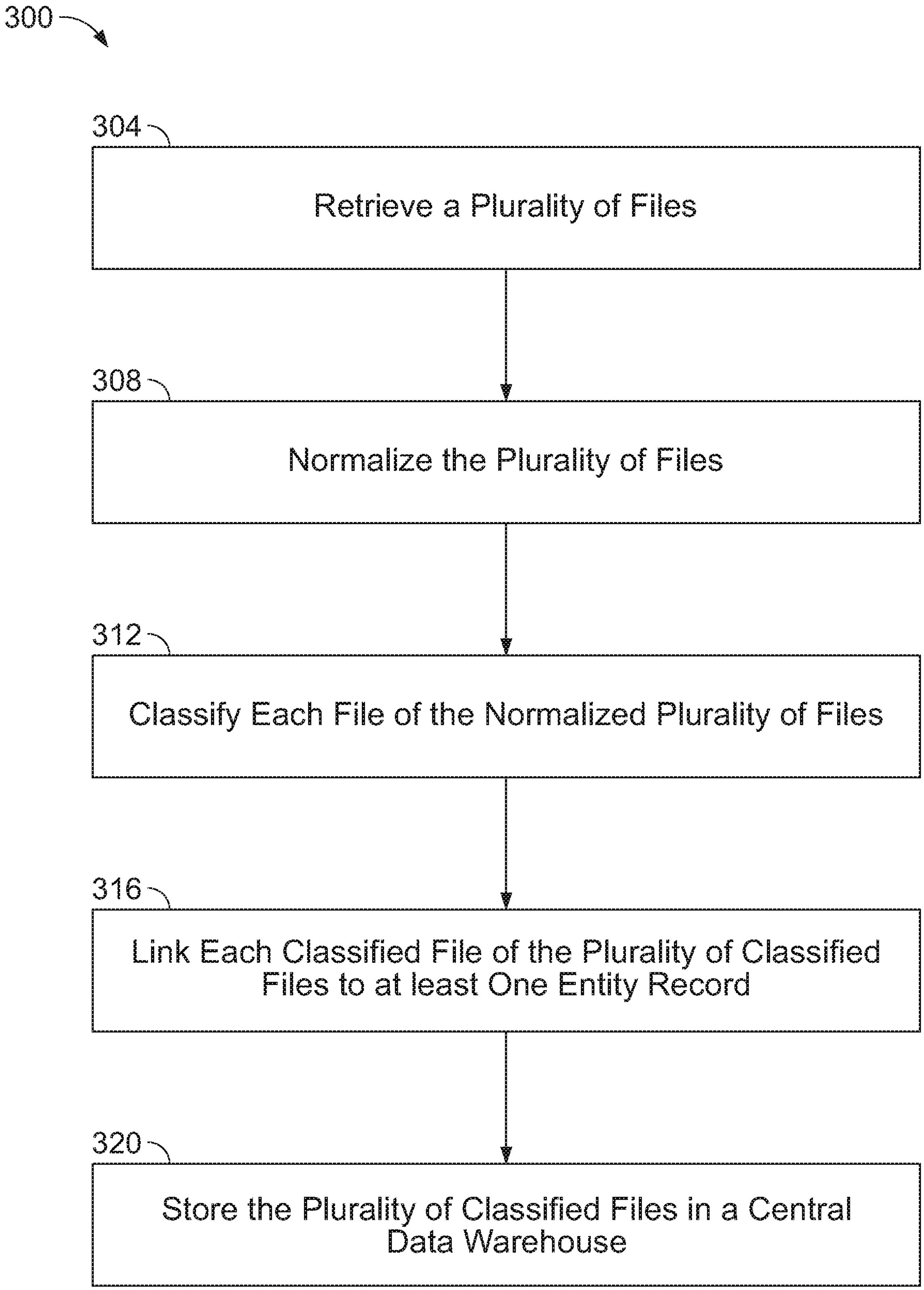
FIG. 3 is a flow diagram of a method for classifying and linking files to an entity data record, according to an example embodiment.

Referring now to FIG. 3, a method 300 classifying and linking files to an entity data record is shown, according to an example embodiment. While different overall, it should be understood that any steps or discussion of the methods 200 and 400 may be applied or included within the method 300, and vice versa, and that such combinations are included within the scope of the present disclosure. For example, the method 300 may include any of the steps 204-220 or 404-452, after or before any steps included in the method 300; the method 200 may include any of the steps 304-320 or 404-452 after or before any of the steps included in the method 200; and the method 400 may include any of the steps 204-220 or 304-320, after or before any of the steps included in the method 400.

Method 300 can be carried out by the system of FIG. 1. More particularly, the method 300 can be carried out by the circuits (e.g., the processing circuit 116, the network crawler 122, etc.) of the entity extraction computing system 104 and through communication with the partner computing system 108, the client computing device 112, and/or the network repositories 162*a*-162*n*.

Method 300 commences at step 304 at which the entity extraction computing system 104 retrieves multiple files. As described herein, the files may be web files received or retrieved from the network repositories 162*a*-162*n* including structure files (e.g., hypertext markup language (HTML) files, extensible markup language (XML) files, etc.), presentation files (e.g., cascading style sheet (CSS) files, etc.), programming files (e.g., JavaScript files, etc.), media files (e.g., image files, video files, etc.), data files (e.g., XML files, JSON files, etc.), and the like. In other embodiments, the files may be other file types (e.g., document files, spreadsheet files, etc.).

Step 304 may include multiple steps to determine or retrieve the files. For instance, prior to step 304, the entity extraction computing system 104 may generate or receive a seed file. The seed file is associated with a specific potential entity and include a seed list. The seed list may include links (e.g., network URLs, hyperlinks, reference pointers, etc.) that are associated with one or more suspected entities. Accordingly, the entity extraction computing system 104 may generate or receive the seed file; crawl the network 118 for associated URLs based on the seed file; and receive additional files (the files of step 304), in response to crawling the network 118 (as discussed herein with regard to the network crawling circuit 122).

In some embodiments, prior to step 304, the entity extraction computing system 104 may generate or receive a list of potential entities (e.g., a list of health care provider (HCP) identifiers (e.g., name, national provider identifier (NPI), specialty, address, etc.)) and generate a request including the list, an API key, and/or a text query (e.g., "for each HCP of the list, find one or more associated URLs"). Then, the entity extraction computing system 104 may output the request to the partner computing system 108 and receive the seed file including the seed list in response.

In some embodiments, each seed file may be associated with a specific potential entity. For instance, the entity extraction computing system 104 may receive a first seed list associated with a first potential entity, a second seed list associated with a second potential entity, and so on. In other embodiments, each seed file may be associated with multiple entities (e.g., a first seed list associated with two hundred potential entities).

In some embodiments, the entity extraction computing system 104 may generate a queue (e.g., the frontier or URL queue) or other data structure (e.g., a file) and place the seed list of the seed file(s) into the queue.

Once the entity extraction computing system 104 has received the seed file and/or generated the queue, the entity extraction computing system 104 may crawl the network 118 to retrieve or receive the files of step 304. For instance, the entity extraction computing system 104 may select a URL from the queue, generates and outputs a request (e.g., to a web server associated with the URL, to the network repository (e.g., 162*a*-162*n*) associated with the request, etc.), and receive a file in response (e.g., an HTML file including HTML data including text, images, etc.).

In some embodiments, at or after step 304, the entity extraction computing system 104 may extract additional URLs by adding URLs of the file to the queue. In some embodiments, the entity extraction computing system 104 verifies the URL based on one or more rule criterion (e.g., a specific subdomain in the URL, a specific file type, and other rule criterion described herein). In some embodiments, the entity extraction computing system 104 normalizes the URL by converting the URLs into a standard, canonical format (e.g., ensuring consistency in capitalization, removing default port numbers, or resolving relative paths).

Once the entity extraction computing system 104 has received the multiple files, the method 300 proceeds to step 308 at which the entity extraction computing system 104 normalizes each of the received files. For instance, the entity extraction computing system 104 may separate each file into multiple constituent files. In one example, an HTML file may include other files therein (e.g., image files, hyperlinked files or URLs, etc.) Accordingly, at step 308, the entity extraction computing system 104 may normalize the file by separating the file into each of the corresponding constituent files. In another example, the entity extraction computing system 104 may convert each file into a single consistent file type (e.g., an HTML file, a text file, etc.). In other embodiments, the entity extraction computing system 104 may deduplicate the files at step 308, by removing any duplicate files that were retrieved more than once. In some embodiments, at or after step 308, the entity extraction computing system 104 may generate a file data record that stores data pertaining to the specific files, the link to the entity data record, and the like.

Once the entity extraction computing system 104 has normalized the files, the method 300 proceeds to step 312 at which the entity extraction computing system 104 classifies each of the files. For instance, the entity extraction computing system 104 may assign each of the files one or more classifications of multiple classifications (e.g., a first classification, a second classification, a third classification, etc.). The classifications will be described further herein, but may organize the files based on the type and variety of information included in the file. For instance, a file associated with an event the entity may have attended may be classified as a first classification (e.g., "event" classification). In comparison, a file associated with a publication or written-work of the entity may be assigned a second classification (e.g., "publication" classification). In another example, a file associated with a qualification, work history, or award history may be assigned a third classification (e.g., CV or "resume" (also referred to as "affiliations" classification).

In some embodiments, the classifications are not mutually exclusive such that a file may be assigned or tagged with multiple classifications. For instance, a file that includes reference to the work history of an entity and the publications of an entity may be assigned the second classification and the third classification. In other embodiments, each file may only be assigned or tagged with a single classification.

To classify each of the files, the entity extraction computing system 104 may generate a request including the file, an API key, and/or a text query (e.g., from this set of classifications, classify the attached document," etc.). The entity extraction computing system 104 may then output the request to the partner computing system 108, and, in response, receive a response file from the partner computing system 108. The response file may include or identify the classification of the specific file and/or a confidence interval or value associated with the classification. The entity extraction computing system 104 may then assign the file the received classification. In some embodiments, if the confidence interval or value is below a specific threshold percentage or value, the entity extraction computing system 104 may output the file to the client computing device 112 for a second classification. The user of the client computing device 112 may review the file and select a corresponding classification. The entity extraction computing system 104 may then receive a file including or indicating the selected classification from the client computing device 112.

In some embodiments, the entity extraction computing system 104 may output the file to multiple partner computing systems (not shown). For instance, the entity extraction computing system 104 may generate first request including the file, a first API key, and a first text prompt. The entity extraction computing system 104 may then output the request to the first partner computing system (which may be associated with a first AI partner) and receive a first response file in response. The first response file may include a first classification. Then, the entity extraction computing system 104 may generate a second request (including the file, a second API key, and a second text prompt) and output the second request to a second partner computing system (which may be associated with a second AI partner (e.g., OpenAIR). In this regard, each request may include a different API key (e.g., a first API key and a second API key). In response, the entity extraction computing system 104 may receive a second response file including a second classification. Then, in response to the first classification matching the second classification, the entity extraction computing system 104 may assign the file with the corresponding classification. In some embodiments, the entity extraction computing system 104 may generate and output a second request to a second partner computing system (not shown) in response to the confidence interval or value being below a specific threshold percentage or value.

In some embodiments, the entity extraction computing system 104 may provide the file and text query to the AI model execution service. In some embodiments, the entity extraction computing system 104 may classify the file using a classification algorithm. For instance, the entity extraction computing system 104 may classify the file based on the text include therein using a binary classification model or algorithm, a logistic regression model or algorithm, a Support Vector Machines (SVMs) model or algorithm, a Multinomial Naive Bayes (MNB) model or algorithm, and the like.

In some embodiments, to assign or tag the file with the classification, the entity extraction computing system 104 may modify the file to include the classification therein. In other embodiments, the entity extraction computing system 104 may generate the file or document data record including the file itself and the classification in a classification field of the file or document data record. In other embodiments, the entity extraction computing system 104 may store the files in specific classification repositories of the central data warehouse 130 based on the classification. For instance, the central data warehouse 130 may include a first repository (not shown) associated with the first classification. Accordingly, in response to assigning a file the first classification, the entity extraction computing system 104 may store the file in the first repository.

Once the entity extraction computing system 104 has classified each of the files, the method 300 proceeds to step 316 at which the entity extraction computing system 104 links the classified files to one of the entity records of the entity repository 132. To link the file and the entity record, the entity extraction computing system 104 may select the entity record from the entity repository 132 and add a link (e.g., a URL, a reference pointer, a hyperlink, etc.) that points to the file to the entity record. For instance, the entity record may include a linked file field, and the link to the file may be added to the linked file field. In some embodiments, the entity extraction computing system 104 may modify the document or file data record to include a link to the linked entity data record (e.g., in a linked entity field).

In some embodiments, the entity data record may include a linked file field for each classification type (e.g., a field for the first classification, a field for the second classification, etc.). Accordingly, to assign the file with a classification, the entity extraction computing system 104 may add a link to the corresponding classification field of the linked entity data record. For instance, a first file may be assigned a first classification. Accordingly, at step 316, the entity extraction computing system 104 may add a link to the first file in the field associated with the first classification type of the entity data record.

In some embodiments, the entity extraction computing system 104 may link the files to the entity associated with the seed files. For instance, the entity extraction computing system 104 may generate a seed file for a specific entity or entity data record, and then receive the file based on the seed file. Accordingly, at step 316, the entity extraction computing system 104 may link the file to the entity record associated with the seed file.

In other embodiments, the entity extraction computing system 104 may generate a request including the file, and API key, and a text query (e.g., "determine the name of any medical professionals who appear in this file," "determine the NPI of any medical professionals who appear in this file," etc.), and output the text query to the partner computing system 108. Then, in response, the entity extraction computing system 104 may receive a response file including an entity identifier. Then, the entity extraction computing system 104 may query or search the entity repository 132 for an entity data record that matches the entity identifier. In response to determining a matching entity data record, the entity extraction computing system 104 may link the file and the matching entity data record.

Once the entity extraction computing system 104 has linked the file and a corresponding entity data record, the method 300 proceeds to step 320 at which the entity extraction computing system 104 stores the file in the central data warehouse 130. In some embodiments, the entity extraction computing system 104 may store the file in a repository of the central data warehouse 130 based on the classification of the file (as described herein). In other embodiments, the entity extraction computing system 104 may store the file in a repository of the central data warehouse 130 associated with the linked entity data record of the file. For instance, the central data warehouse 130 may include a separate repository for each entity data record, and store files linked to the entity data record in the specific repository. In some embodiments, the entity extraction computing system 104 may store each file in a single repository of the central data warehouse 130.

In some embodiments, the entity extraction computing system 104 may determine the entity data record is to be updated based on the files. For instance, the entity extraction computing system 104 may determine the normalized files indicate at least a portion of the entity data record is changed and generate a data change request based on the files. Then, the entity extraction computing system 104 may output the data change request to the client computing device 112. In response, the client computing device 104 may generate a request to modify the entity data record. In some embodiments, the entity extraction computing system 104 may update or modify the entity data record based on the entity data request.

In some embodiments, the entity extraction computing system 104 may generate a request including the files, the entity data record, a key, and/or a text query. The entity extraction computing system 104 may then output the request to the partner computing system 108. In response, the partner computing system 108 may generate a response file indicating whether the entity data record is to be updated. In some embodiments, the response file may include an updated version of the entity data record.

Figure 4A:
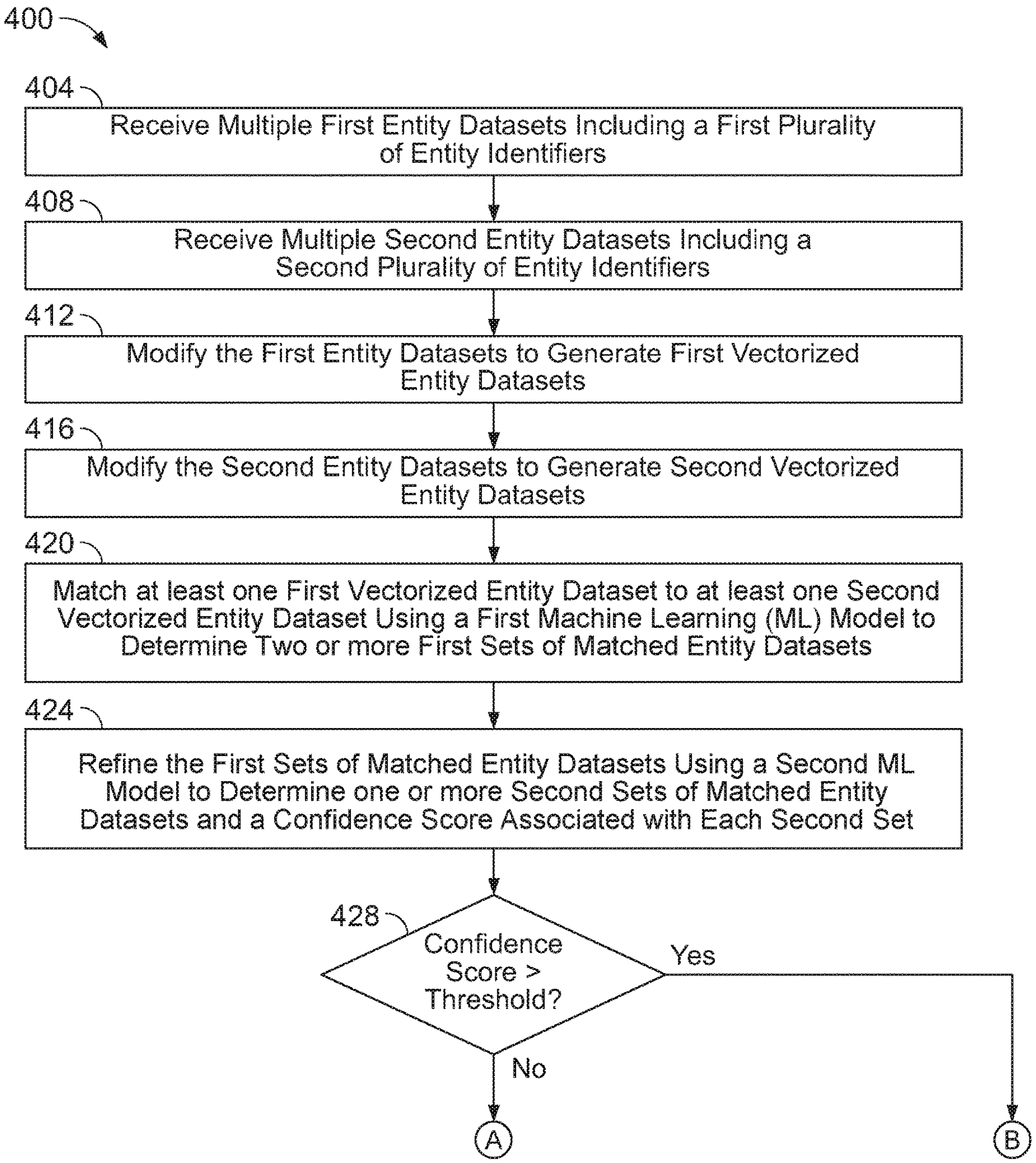
FIGS. 4A-4B are a flow diagram of a method for multi-stage matching of entity datasets, according to an example embodiment.
Figure 4B:
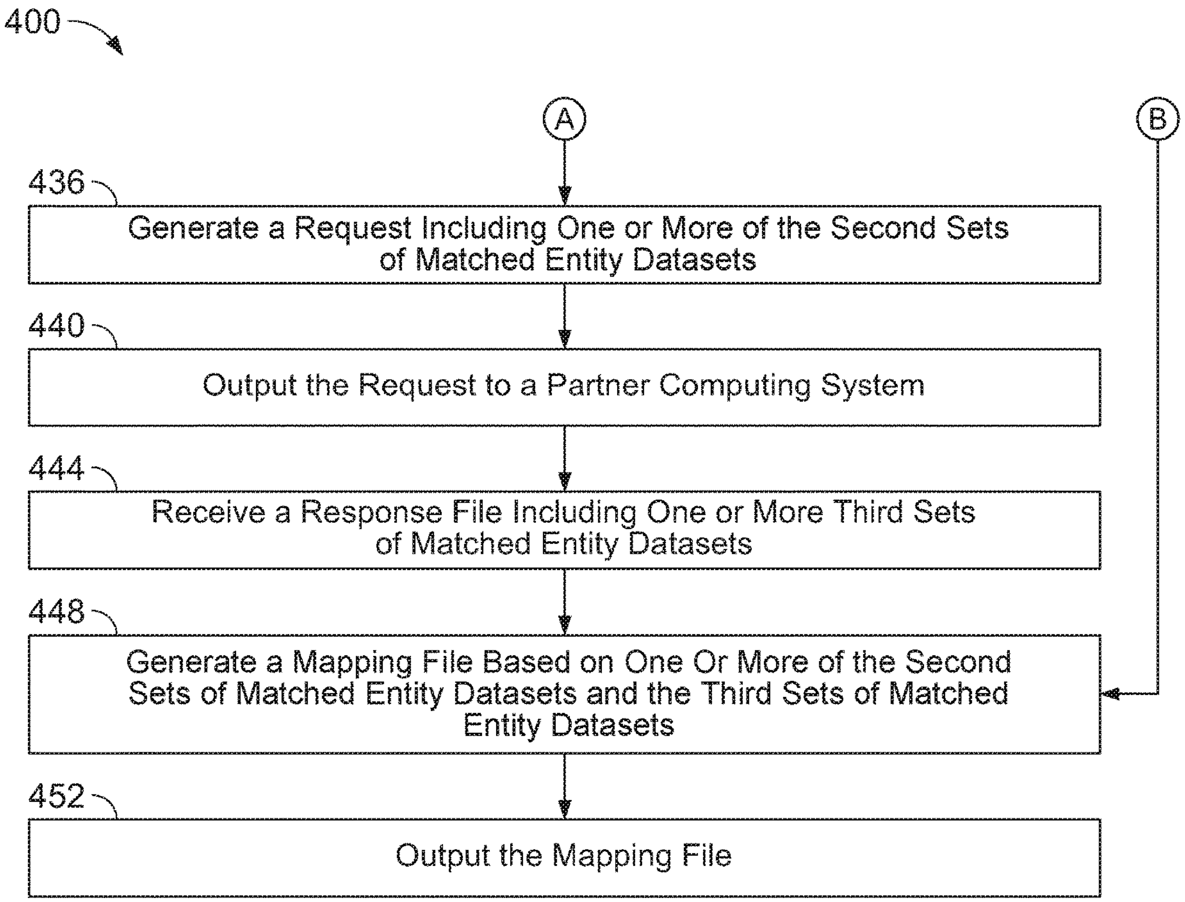

Referring now to FIGS. 4A-4B, a method 400 of entity matching and linking is shown, according to an example embodiment. Method 400 can be carried out by the system of FIG. 1. More particularly, the method 400 can be carried out by the circuits (e.g., the processing circuit 116, the network crawler 122, etc.) of the entity extraction computing system 104 and through communication with the partner computing system 108, the client computing device 112, and/or the network repositories **162*a*-162*n***.

Method 400 commences at step 404 at which the entity extraction computing system 104 receives multiple first entity datasets. As described herein, each entity dataset may be associated with a specific entity (e.g., Dr. John Smith) and include a first entity identifier (e.g., a name, a NPI, a unique identifier (UID) associated with the entity, etc.). Moreover, each entity dataset may include additional data associated with the entity such a list of activities, publications, congress reports, affiliations, and the like associated with the specific. In some embodiments, the additional data may be identified via an activity or document identifier associated with the document. For instance, three congress reports and a publication may be linked to a specific entity (see the method 300).

Accordingly, the entity dataset may include a document or file identifier associated with the first congress report, a document or file identifier associated with the second congress report, a document or file identifier associated with the third congress report, and a document or file identifier associated with the publication. In other embodiments, the entity dataset may include each of the files or documents therein. In some embodiments, each entity dataset may include or correspond to the entity records described with reference to the method 200. In other embodiments, each entity dataset may correspond or include one of the classified file(s) described with reference the method 300. For instance, as described herein, a first set of entity data records may correspond to the entity data records of the method 200, and a second set of entity data records may correspond to the classified files and/or the file data records of the method 300, where each set of entity data records includes or identifies a specific entity identifier (e.g., an entity name, an NPI, an entity address, a combination of one or more, etc.). In this regard, the first entity datasets may be structured according to a first data structure (similar to the entity data records), and the second entity datasets may be structured according to a second data structure (similar to the classified files or the file data records).

In some embodiments, each entity dataset may include multiple entity identifiers. For instance, a first entity dataset may include a first entity identifier (e.g., a name), a second entity identifier (e.g., a current country of residence), and a third entity identifier (e.g., an NPI). In other embodiments, each entity identifier may include at least one entity identifier, such that some entity datasets may include multiple entity identifiers and some may include only one.

Once the entity extraction computing system 104 has received the first entity datasets, the method 400 proceeds to step 408 at which the entity extraction computing system 104 receives multiple second entity datasets. The second entity datasets may be similar or the same as the first entity datasets and include an entity identifier for each entity. In some embodiments, the first entity datasets may be received from the client computing device 112, and the second entity datasets may be internal to the entity extraction computing system 104 (generated via the methods 200 and 300). In this regard, the first entity datasets may be associated with a specific client and may not be stored in the entity extraction computing system 104, whereas the second entity datasets may be stored in the entity extraction computing system 104 (e.g., in the entity repository 132). In this regard, at step 408, the second entity datasets may be received or retrieved from the entity repository 132. In some embodiments, the first entity datasets may be new entity datasets of the entity extraction computing system 104 which are to be deduplicated and merged with the existing entity datasets (e.g., the second entity datasets) of the entity extraction computing system 104.

Once the entity extraction computing system 104 has received the second entity datasets, the method 400 proceeds to step 412 at which the entity extraction computing system 104 generates multiple first vectorized entity datasets based on at least a portion of the first entity datasets. As described herein, vectorized entity datasets may be numerical vectors which represent data as a list of numbers so that related concepts are mathematically closer to each other in a multi-dimensional space. Accordingly, at step 412, the entity extraction computing system 104 may generate or modify at least a portion of the entity datasets to generate the vectorized entity datasets. In some embodiments, the entity extraction computing system 104 may generate a vectorized entity dataset for each entity dataset. In some embodiments, the first vectorized entity datasets may be generated based on the entity identifiers. For instance, at step 412, the entity extraction computing system 104 may modify or transform each entity identifier from a text value to an entity vector representation. In other embodiments, the first vectorized entity datasets may be generated based on multiple portions of the first entity datasets. For instance, an entity dataset may include multiple entity identifiers, and the vectorized entity dataset may be generated based on the multiple entity identifiers.

For example, the entity extraction computing system 104 may generate identifier keys which may be fields of the entity datasets that are combined to create a single value or key, and for which a match between two data records is indicative of a match in entities or identifications. For instance, one key may be the social security number (e.g., 11-111-1111) and the name of the entity of the entity dataset (e.g., John) combined. Accordingly, the key may be both value combined or concatenated (e.g., 11-111-1111+John or 111111111John). Another key may be the social security number and the date of birth of the entity of the entity dataset combined (e.g., 11-111-1111+Dec. 7, 1995 or 11111111112071995). In this regard, at or prior to step 412, the entity extraction computing system 104 may generate multiple keys for each entity dataset, where each key is a combination of one or more of the fields of the of the entity dataset. For instance, the entity dataset may include 6 fields, and the entity extraction computing system 104 may generate up to 720 keys (e.g., any combination of the 6 fields or 6!=720).

In some embodiments, the entity extraction computing system 104 may determine which specific key to use to match the entity datasets (e.g., at step 420 or step 428) based on a frequency score of a frequency table or file. The frequency table may include specific commonly occurring entity dataset fields, and reflect each with a percentage or value (the frequency score) indicating the frequency or lack of uniqueness for the field. In this regard, at step 412 the entity extraction computing system 104 may determine the frequency score for each field of the entity dataset, and then select the key which corresponds with the lowest frequency score overall (e.g., the sum of the frequency score for each key included therein). For instance, entity extraction computing system 104 may generate a key for a first entity dataset including a first name with a high frequency score (e.g., John), last name with a high frequency score (e.g., Smith), a date of birth with a high frequency score (e.g., Jan. 1, 1995), a social security number with a low frequency score (e.g., 11-123-1234), and an insurance or cardholder ID with a low frequency score (e.g., 111111111). Accordingly, the entity extraction computing system 104 may determine a frequency score for each key (e.g., first name+social security number, last name+social security number, date of birth+social security number, etc.).

In some embodiments, the frequency score of a key is equivalent to the frequency score of each of the fields of the key divided by the number of features in the key. For instance, a specific key may include three fields (e.g., first name, last name, and social security number), and each field may be assigned a specific frequency score (e.g., 0, 0, 10). Accordingly, the frequency score of the key including each of the fields may be equivalent to the frequency score of each of the fields of the key (0+0+10=10) divided by the number of features in the key (3). In that regard, the frequency score would be 3.333 (e.g., 10/3). By generating the frequency score of the key based on the frequency score of the features and the number of features included in the key, the frequency score better represents each of the features included therein, and the likelihood of a match based on the number of features. For instance, if a key has greater than a threshold frequency score, it may be deleted or marked as too frequent to be matched on.

By utilizing a frequency score, the present systems and methods provide for a technical improvement to matching algorithms and data deduplication techniques by utilizing keys that are likely to result in a unique match and not return a false positive. For instance, because the present systems and methods calculate a frequency score associated each field and/or key and then eliminate or strike certain keys based on the frequency scores, the present systems and methods do not attempt to perform matches on keys that are likely to return false positives, thereby using less processing power to perform matches that will return false positives and not actually show a true match. For instance, matching on high-frequency keys generates a massive number of potential record pairs for comparison by the present system. Accordingly, by striking these common keys, the present system spends less time processing and comparing millions of pairs that are likely to be incorrect. This prunes the search space of potential matches, leading to a substantial increase in algorithmic efficiency and a reduction in processing time and power. Likewise, because the keys may be deleted and not saved based on a high frequency score, the present systems and methods use less memory to store keys that will potentially result in false matches.

Moreover, by proactively striking specific, overly frequent matching keys (like common names or generic terms) to avoid false matches, the present systems provide for improved precision and a reduction in false positives within data linkage and entity resolution systems. For instance, highly frequent keys (high-frequency keys), such as common last names ("Smith," "Lee") or generic address elements ("Main Street," "Avenue"), have a low discriminative power. Matching on these keys alone often results in linking records that belong to different entities (false positives). Accordingly, by striking or down-weighting these keys and forcing the system to rely on less frequent, more unique combinations of keys (e.g., date of birth+rare middle name+specific ZIP code), the process ensures that matches are based on stronger, less ambiguous evidence which directly increases the precision of the match results.

Once the entity extraction computing system 104 has generated the first set of vectorized entity datasets based on the first entity datasets, the method 400 proceeds to step 416 at which the entity extraction computing system 104 generates a second set of vectorized entity datasets based on the second entity datasets. In some embodiments, steps 412 and 416 may be combined, and the entity extraction computing system 104 may generate the vectorized entity datasets for each of the first entity datasets and the second entity datasets at the same time. In other embodiments, step 416 may be skipped because the second vectorized entity datasets have been previously generated (e.g., during a first matching process). In some embodiments, after steps 412 and/or 416, the entity extraction computing system 104 may store the vectorized entity datasets in a vector repository (not shown).

Once the entity extraction computing system 104 has generated the vectorized entity datasets, the method 400 proceeds to step 420 at which the entity extraction computing system 104 matches the first vectorized entity datasets to the second vectorized entity datasets using a first ML model. For instance, at step 420, the entity extraction computing system 104 may select a first ML model from the model repository 133. In some embodiments, the first ML model may be a vector matching ML model that is configured to match the various vectorized entity datasets based on their corresponding vector values. For instance, the first ML model may be a similarity scoring ML model (e.g., a cosine similarity model), an approximate nearest neighbor (ANN) model, a two-tower (bi-encoder) model, and the like.

In some embodiments, prior to step 420, the entity extraction computing system 104 may generate or train the first ML model. For instance, the entity extraction computing system 104 selects or determines feature data based on one or more of: the entity data records, the vectorized entity data records, the frequency table, flagged sets of matched entity datasets, the files or documents associated with the entity data records, and the like.

The feature data is features or portions of the data records that may specifically influence the statistical values and is used to train the digital model. In this this regard, the entity extraction computing system 104 may determine and pick feature data from among the various data records/datasets described herein. Moreover, feature data may be model specific, such that a first model selects different data records as feature data when compared to a second model.

Feature selection may included two parts including pre-selected or manually selected feature selection and machine or machine learning (ML) selected feature selection. Pre-selected or manually selected feature selection of the feature data may take place prior to or after ML feature selection. In some embodiments, manually selected feature data may be pre-selected (as indicated in the digital model program or in the query) to learn the effect the specific features have on the statistical values. For example, manually selected feature data may include any of the entity datasets (and the fields thereof), the entity vectors (and the fields thereof), the keys of each entity dataset, files or documents associated with the entity datasets, and the like In comparison, ML feature selection may be performed by entity extraction computing system 104 to select various features based on applicability and effect on the matching. For example, through various methods the ETL computing system 204 may determine that specific features have an effect. In one instance, the ETL computing system 204 may determine that two or more dataset fields are linearly dependent or non-informative such that only one of the features needs to be included in the feature data. An example of linearly dependent fields may be age and date of birth. To select ML selected feature data from among the data records descried herein (and the fields thereof), the entity extraction computing system 104 may use one or more ML feature selection techniques such as filter methods, wrapper methods, embedded methods, or other hybrid methods.

Filter methods pick up intrinsic properties of possible features (i.e., the aggregate information) measured via univariate statistics. Examples of filter methods include the information gain method, the chi-square test method, Fisher's score method, the correlation coefficient method, the variance threshold method, the mean absolute difference method, and the dispersion ratio method. In comparison, wrapper methods search the space of all possible subsets of features, assessing their quality by learning and evaluating a ML model with that feature subset. Examples of wrapper methods include the forward feature selection method, the backward feature elimination method, the exhaustive feature selection method, and the recursive feature elimination method. Embedded methods are similar to both the wrapper and filter methods by looking at interactions between features while also minimizing computational cost. Examples of embedded methods include the LASSO regularization method and the random forest importance method. Hybrid methods combine one or more filter methods, wrapper methods, or embedded methods.

In one example, the entity extraction computing system 104 may determine ML selected feature data using multiple stages of feature selection. For instance, the entity extraction computing system 104 may first (i.e., at the first stage) determine the variance for each of the features and remove any features with substantially zero variance. Next, the entity extraction computing system 104 may determine the fill rate or fill count for each of the features and remove features that have low fill rate (e.g., 3% or less). For example, the entity extraction computing system 104 may determine the total number (e.g., the sum) of non-zero values for a feature and divide it by the total number of that feature. If that total number of non-zero values or percentage is under a threshold value or percentage, the feature may be removed. Next, the entity extraction computing system 104 may remove correlated (i.e., linearly dependent) features using variance inflation (VIF). VIF is the ratio of the variance of a feature in a model that includes other terms by the variance of the model constructed using only one term, and thereby quantifies the severity of multicollinearity of a feature. In this regard, the higher the VIF, the more the feature is correlated with other features. In some embodiments, if the VIF of a feature is above 10 or above 5, the feature is removed from the feature data by the entity extraction computing system 104. Next, the entity extraction computing system 104 may rank may reduce the number of features to a specific value (e.g., under 50 features or 25-50 features (e.g., 20 features, 25 features, 30 features, 35 features, 50 features, etc.) using a regularizing gradient boosting framework (e.g., XGBoost) and fit the data by minimizing binary classification error rate (e.g., the number of incorrect predictions based upon the aggregate information).

In some embodiments, the entity extraction computing system 104 may further use or apply principle component analysis to reduce dimensionality and correlation between non-media exposure features of the first feature information. PCA is an unsupervised technique to reduce dimensionality and correlation between features. In this regard, by utilizing PCA, the entity extraction computing system 104 may significantly reduce the number of features in the final model which helps mitigate collinearity issues. By doing so, the entity extraction computing system 104 lowers computation time and requires less processing power and memory, as compared to typical systems. In some embodiments, after determining the feature data, the entity extraction computing system 104 may store the feature data in a feature data repository (not shown).

Once the entity extraction computing system 104 has determined feature data including multiple features, the entity extraction computing system 104 may generate (i.e., train or determine) the digital model. The digital model may be determined by fitting the feature data to a training dataset to generate one or more model values or coefficients. For instance, the entity extraction computing system 104 may fit the feature data to a training dataset which includes predetermined matches. In this regard, the feature data may be considered the independent variables (e.g., the inputs) and the matching datasets may be considered the dependent variables (e.g., the outcomes).

The digital model may be generated by fitting the independent variables or inputs (e.g., the feature data) to the dependent variables or outcomes (e.g., the preterminal matches) using the to determine or generate coefficients for each feature of the first feature information. The coefficients may represent the fit of the digital model and be used to thereafter determine matches.

Accordingly, at step 420, the entity extraction computing system 104 may use the first ML model to match the first vectorized entity data to the second vectorized entity data and determine sets of matched entity datasets from the first plurality of entity datasets and the second plurality of entity datasets. In one example, the entity extraction computing system 104 may receive 100 entity datasets corresponding to 100 different entities, at step 404. Likewise, the entity extraction computing system 104 may select or receive 10,000 entity datasets corresponding to 10,000 different entities at step 408. Then, at step 420, the entity extraction computing system 104 may use the first ML to create 20,000 sets of matched entity datasets. In this regards, first entity datasets and second entity datasets may be matched multiple times. For instance, a first entity dataset may be matched with four different second entity datasets to generate four sets of matched entity datasets. In some embodiments, at step 420, the entity extraction computing system 104 may determine multiple first entity datasets and second entity datasets which have no match (i.e., are unmatched), which may be reanalyzed at step 440. In other embodiments, those entity datasets may be provided to a client computing device (e.g., 112) for manual matching. In some embodiments, the extraction computing system 104 may then match the unmatched entity datasets using a second ML model.

Once the entity extraction computing system 104 has matched at least a portion of the first entity datasets and the second entity datasets using the first ML model, the method 400 proceeds to step 424 at which the entity extraction computing system 104 refines the first sets of matched entity datasets using a second ML model to determine one or more second sets of matched entity datasets. The second ML model may be selected from the model repository 133 and may be a different type of ML model. For instance, the second ML model may be a classification model that utilizes the entity datasets (as compared to the vectorized entity datasets). For instance, the second ML model may be a linear classification model (e.g., a logistic regression model, a Naïve Bayes model, etc.), a tree-based classification model, a geometric model (e.g., a K-nearest neighbor (KNN) model), and the like.

Prior to step 428, the entity extraction computing system 104 may generate and/or train the second ML model, which may be similar to the process for generating and training the first ML model. While the entity extraction computing system 104 may utilize different feature data and a different combination of feature selection, the overall process may be similar to that of the first ML model.

Accordingly, at step 428, the entity extraction computing system 104 may use the second ML model to match the first entity datasets to the second entity datasets and generate multiple linked entity identifiers and corresponding confidence scores. In one example, the entity extraction computing system 104 may receive 100 entity datasets corresponding to 100 different entities, at step 404. Likewise, the entity extraction computing system 104 may select or receive 10,000 entity datasets corresponding to 10,000 different entities at step 408. Then, at step 420, the entity extraction computing system 104 may use the first ML model to determine 20,000 sets of matched entity datasets. Then, at step 428, the entity extraction computing system 104 may refine, filter, or process the 20,000 sets of matched entity datasets down to 3,000 sets of second entity datasets. In this regard, a first entity dataset including a first entity identifier (e.g., Jacob Smith) may be linked to a second entity dataset including a second entity identifier (e.g., Jake Smith) and assigned a confidence or similarity score (e.g., 0.999).

Once the entity extraction computing system 104 has refined the first sets of matched entity datasets to determine second sets of matched entity datasets using the second ML model, the method 400 proceeds to step 428 at which the entity extraction computing system 104 determines, for each match, if the confidence score is greater than a threshold confidence score. For instance, at step 428, the entity extraction computing system 104 may determine each entity dataset for which the confidence score is below the threshold confidence score. In some embodiments, the threshold confidence score may be received from the client computing device 112. For each match where the confidence score threshold is met, the entity extraction computing system 104 proceeds to step 448, as will be described further herein.

For each match where the threshold confidence score is not met or for each first dataset where there is no match (as discussed with regard to the step 420), the entity extraction computing system 104 proceeds to step 436 at which the entity extraction computing system 104 generates a request including the remaining first entity datasets and the second entity datasets. In some embodiments, the entity extraction computing system 104 may proceed to step 436 with the determined entity datasets (the first entity datasets where there was no match or the match was less than the confidence score threshold) but with all of the second entity datasets. In other embodiments, the entity extraction computing system 104 may proceed to step 436 with a portion of the first entity datasets and a portion of the second entity datasets.

As described herein, the request may include an API key associated with the partner computing system 108, a text query (e.g., "determine matches between the first datasets and the second datasets"), the first entity datasets, and the second entity datasets. In some embodiments, the request may identify previously determined matches and include the confidence scores for the previously determined matches.

Once the entity extraction computing system 104 has generated the request, the method 400 may proceed to step 440 at which the entity extraction computing system 104 outputs the request to the partner computing system 108. In some embodiments, the entity extraction computing system 104 may output or provide the second text query to the AI execution service (not shown) of the entity extraction computing system 104. In some embodiments, the entity extraction computing system 104 may retrieve an API key associated with the customer who provided the first text query and the partner computing system (e.g., 108) to which the query is to be output to.

In response to outputting the request, the method 400 may proceed to step 444 at which the entity extraction computing system 104 receives a response file including a third set of linked entity identifiers or datasets. After receiving the response file, the entity extraction computing system 104 may extract the third set of linked entity identifiers. The third set of linked entities datasets may be similar to the first and second sets but not include a confidence score. In some embodiments, the response file may further include or identify first entity datasets or identifiers for which there are no matches.

Once the entity extraction computing system 104 has received the response file, the method 400 proceeds to step 448 at which the entity extraction computing system 104 generates a mapping file for all of the determined matching entity datasets. The mapping file may include a row or value for each matched entity dataset. For instance, the entity extraction computing system 104 may match 100 first entity datasets to 100 second entity datasets. Accordingly, the entity extraction computing system 104 may generate a mapping file including 100 rows. One for each mapping or link between the first entity datasets and the second datasets. In some embodiments, the mapping file may be a spreadsheet file including a row for each link. In other embodiments, the mapping file may be a data structure (e.g., a table) including a row for each link. For instance, the mapping file may be a table may include a column for an entity data record and a column for mapped files. Accordingly, the entity extraction computing system 104 may update the mapping table based on the determined matches. In some embodiments, the mapping file links the two datasets by including a record identifier or the entity identifier for the two linked datasets. In other embodiments, the mapping file includes a link (e.g., a URL or hyperlink to the two datasets).

In some embodiments, after generating the mapping file, the entity extraction computing system 104 may proceed to step 452 at which the entity extraction computing system 104 outputs the mapping file. In some embodiments, the mapping file may be output to the client computing device (e.g., 112) from which the first entity datasets were received from. In some embodiments, the entity extraction computing system 104 may store the entity datasets therein (e.g., in the entity repository 132, etc.).

In some embodiments, after step 448, the entity extraction computing system 104 may merge the matching first entity datasets and the second entity datasets, and then store the merged datasets in the entity repository 132. To merge the entity datasets, the entity extraction computing system 104 may determine each field of the merged entity datasets based on the entity datasets being merged. For instance, if either dataset is missing a specific field or has an empty/null value in the field, the entity extraction computing system 104 may populate the field of the merged entity dataset based on the entity dataset which has a value stored therein. If both entity datasets being merged have a specific field that is not the same (and also not null or empty), the entity extraction computing system 104 may select the field with the lower frequency score and populate the merged entity dataset with the selected field.

In some embodiments, at or after step 448, the entity extraction computing system 104 may flag or mark matched entity datasets for additional review. For instance, marked entity datasets may be provided to the client computing device 112 for manual matching. In some embodiments, the marked matched entity datasets may be utilized by the entity extraction computing system 104 as training data for the ML models described herein, therein providing a feedback-loop that improves the ML models as more entity datasets are matched. For instance, the entity extraction computing system 104 may flag a specific subset of matched entity datasets and add the entity datasets to the feature data for training of the ML models.

Figure 5:
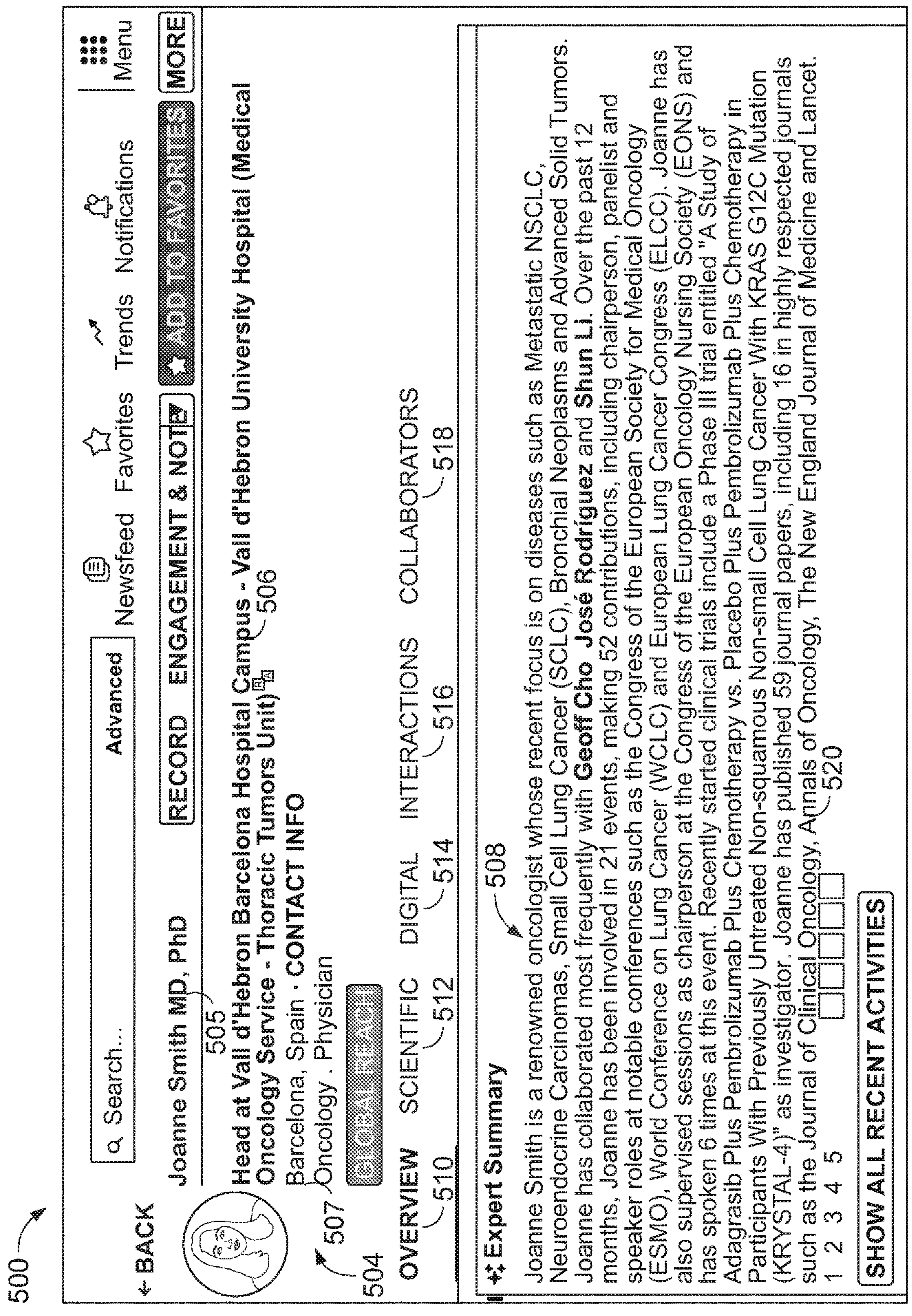
FIG. 5 is an illustration of a user interface displayed by the enterprise data curation system of FIG. 1 to manage an entity record.

Referring now to FIG. 5, a user interfaces presented and displayed to the user of the client computing device 112 during the methods 200-400 are shown, according to example embodiments. As described herein, the user interface of FIG. 5 may be one or more of web interfaces generated by the content management system 112 and rendered by the client computing device 112 as part of a web application or graphical user interfaces downloaded and generated by each of the client computing device 112 as part of a software application (e.g., a mobile application, etc.). Further, the user interface shown on FIG. 5, allows for communication between the user and the entity extraction computing system 104 via the respective client computing device 112 (specifically via the I/O circuit 153). Through interaction with the user interface, the user may provide user input, feedback, and other data requested by the entity extraction computing system 104. In this regard, it should be understood that each interaction described herein by the user with the user interface of FIG. 5 may be provided to the client computing device 112 and then transmitted to the entity extraction computing system 104 and that each action described herein as occurring to the respective client computing device 112 (e.g., navigating to a certain page, generating a popup, etc.) may be performed by the entity extraction computing system 104.

Referring now to FIG. 5, the entity profile page 500 which can be displayed on a display the I/O circuit 153 of the client computing device 112, is shown. In general, the entity profile (e.g., a specific health care provider (HCP)). As shown, the entity profile page 500 includes a general details section 504 and a specific insights section 508. To render or generate the entity profile page 500 on the client computing device 112, the entity extraction computing system 104 may provide an entity data record principal data record to the client computing device 112 for display thereon. In this regard, it should be understood that each of the sections, fields, or buttons of the entity profile page 500 may be or included in the entity data record or entity dataset described herein.

The general details section 504 provides general details or information pertaining to the entity of the entity profile page 500. For instance, the general details section 504 includes a name field 505, which may include a name of the entity of the entity page 500; a title field 506 which may include a job title or description of the entity of the entity page 500, and a location field 507, which may include a location (e.g., city and state, city and country, etc.) of the entity of the entity page 500.

The specific insights section 508 provides specific AI-generated insights or information pertaining to the entity of the entity page 500 and includes multiple buttons or options and a text response field 520. For instance, the specific insights section 508 may include multiple buttons such as an overview button 508, a scientific button 510, a digital button 512, an interactions button 514, and a collaborators button 516. As described herein, each button may correspond to a specific query type. For instance, in response to a selection of a first button (e.g., the overview button 508), the client computing device 112 may generate a query including or identifying a first query type and the entity record associated with entity page 500. The client computing device 112 may then output the request to the entity extraction computing system 104. Then, in response to receiving a text response from the entity extraction computing system 104, the client computing device 112 may display the text response in the text response field 520.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

As used herein, the term "circuit," "controller," "extractor," "service," or "application(s)"/"app(s)" may include hardware configured to execute the functions described herein. In some embodiments, each respective "circuit," "controller," "extractor," or "application(s)"/"app(s)" may include machine-readable media for configuring the hardware to execute the functions described herein. The "circuit," "controller," "extractor," "service," or "application(s)"/"app(s)" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit," "controller," "extractor," "service," or "application(s)"/"app(s)" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit," "controller," "extractor," "service," or "application(s)"/"app(s)" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components configured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for optimizing computational resources in multi-stage entity resolution via machine learning (ML) and artificial intelligence (AI), the method comprising:

receiving, by a computing system, a first plurality of entity datasets from a client computing device, wherein the first plurality of entity datasets are each structured according to a first data structure, wherein the first data structure is a file data structure including a file field, a file classification field, and an entity name field;

retrieving, by the computing system, a second plurality of entity datasets from a first repository of the computing system, wherein the second plurality of entity datasets are each structured according to a second data structure, wherein the second data structure is an entity data structure including a name field, an address field, and a national provider identifier (NPI) field;

matching, by the computing system, at least one entity dataset of the first plurality of entity datasets to at least one entity dataset of the second plurality of entity datasets using a first ML model to determine two or more first sets of matched entity datasets;

refining, by the computing system, the two or more first sets of matched entity datasets using a second ML model to determine one or more second sets of matched entity datasets and a confidence score associated with each second set;

determining, by the computing system, a third plurality of entity datasets including each entity dataset of the one or more second sets of matched entity datasets associated with a confidence score less than a threshold confidence score;

generating, by the computing system, a request including the third plurality of entity datasets, at least one entity dataset of the second plurality of entity datasets, and a key;

outputting, by the computing system, the request to a partner computing system associated with an AI partner; and receiving, by the computing system and in response to outputting the request, a response file including one or more third sets of matched entity datasets.

2. The method of claim 1, wherein the first ML model is a vector matching ML model, and wherein the second ML model is a classification model.

3. The method of claim 1, further comprising:

generating, by the computing system, a mapping file identifying the one or more second sets of matched entity datasets associated with a confidence score greater than the threshold confidence score and the one or more third sets of matched entity datasets; and outputting, by the computing system, the mapping file.

4. The method of claim 3, wherein each entity dataset of the second plurality of entity datasets includes a link to a data record, and wherein the mapping file further identifies each linked data record for each entity dataset of the one or more second sets of matched entity datasets associated with a confidence score greater than the threshold confidence score and the one or more third sets of matched entity datasets.

5. The method of claim 1, further comprising:

selecting, by the computing system, a mapping table from a repository of the computing system;

modifying, by the computing system, the mapping table to identify the one or more second sets of matched entity datasets associated with a confidence score greater than the threshold confidence score and the one or more third sets of matched entity datasets; and storing, by the computing system, the mapping table in the repository.

6. A method for optimizing computational resources in multi-stage entity resolution via machine learning (ML) and artificial intelligence (AI), the method comprising:

receiving or retrieving, by the computing system, a first plurality of entity datasets structured according to a first data structure, wherein the first data structure is a file data structure including a file field, a file classification field, and an entity name field;

receiving or retrieving, by the computing system, a second plurality of entity datasets structured according to a second data structure, wherein the second data structure is an entity data structure including a name field, an address field, and a national provider identifier (NPI) field;

modifying, by the computing system, the first plurality of entity datasets to generate a first plurality of vectorized entity datasets;

modifying, by the computing system, the second plurality of entity datasets to generate a second plurality of vectorized entity datasets;

matching, by the computing system, at least one vectorized entity dataset of the first plurality of vectorized entity datasets to at least one vectorized entity dataset of the second plurality of vectorized entity datasets using a ML model to determine two or more sets of matched vectorized entity datasets;

determining, by the computing system, a third plurality of entity datasets based on the two or more sets of matched vectorized entity datasets;

generating, by the computing system, a request including the third plurality of entity datasets and a key;

outputting, by the computing system, the request to a partner computing system associated with an AI partner; and receiving, by the computing system and in response to outputting the request, a response file including one or more sets of matched entity datasets.

7. The method of claim 6, wherein the ML model is a first ML model, wherein the two or more sets of matched vectorized entity datasets are two or more first sets of matched vectorized entity datasets, wherein matching the at least one vectorized entity dataset of the first plurality of vectorized entity datasets to the at least one vectorized entity dataset of the second plurality of vectorized entity datasets using the ML model further determines one or more unmatched vectorized entity datasets, and wherein the method further comprises:

determining, by the computing system, a fourth plurality of entity datasets based on the one or more unmatched vectorized entity datasets;

matching, by the computing system, at least one entity dataset of the fourth plurality of entity datasets to at least one entity dataset of the second plurality of entity datasets using a second ML model to determine one or more second sets of matched entity datasets and a confidence score associated with each second set;

determining, by the computing system, a fifth plurality of entity datasets including each entity dataset of the one or more second sets of matched entity datasets associated with a confidence score less than a threshold confidence score, wherein the request further includes the fifth plurality of entity datasets.

8. The method of claim 7, wherein the first ML model is a vector matching ML model, and wherein the second ML model is a classification model.

9. The method of claim 6, wherein the first plurality of entity datasets are received from a client computing device, and wherein the second plurality of entity datasets are retrieved from a repository of the computing system.

10. The method of claim 6, further comprising:

generating, by the computing system, a mapping file identifying the two or more sets of matched vectorized entity datasets and the one or more sets of matched entity datasets; and outputting, by the computing system, the mapping file.

11. A method for optimizing computational resources in multi-stage entity resolution via machine learning (ML) and artificial intelligence (AI), the method comprising:

receiving or retrieving, by a computing system, a first plurality of entity datasets, each entity dataset of the first plurality of entity datasets including at least one entity identifier;

receiving or retrieving, by the computing system, a second plurality of entity datasets, each entity dataset of the second plurality of entity datasets including at least one entity identifier;

matching, by the computing system, at least one entity dataset of the first plurality of entity datasets to at least one entity dataset of the second plurality of entity datasets using a first ML model to determine two or more first sets of matched entity identifiers;

refining, by the computing system, the two or more first sets of matched entity identifiers using a second ML model to determine one or more second sets of matched entity identifiers and a confidence score associated with each second set;

determining, by the computing system, a third plurality of entity datasets based on the one or more second sets of matched entity identifiers;

selecting, by the computing system, a mapping table from a repository of the computing system;

modifying, by the computing system, the mapping table to identify the one or more second sets of matched entity identifiers associated with a confidence score greater than a threshold confidence score;

storing, by the computing system, the mapping table in the repository;

generating, by the computing system, a request including the third plurality of entity datasets and a key;

outputting, by the computing system, the request to a partner computing system;

receiving, by the computing system and in response to outputting the request, a response file including one or more third sets of matched entity identifiers; and generating, by the computing system, a mapping file including the one or more second sets of matched entity identifiers and the one or more third sets of matched entity identifiers.

12. The method of claim 11, wherein matching the at least one entity dataset of the first plurality of entity datasets to the at least one entity dataset of the second plurality of entity datasets using the first ML model further determines one or more unmatched entity datasets, and wherein the method further comprises:

determining, by the computing system, a fourth plurality of entity datasets based on the one or more unmatched entity datasets;

wherein the request further includes the fourth plurality of entity datasets.

13. The method of claim 11, wherein the first ML model is a vector matching ML model, and wherein the second ML model is a classification model.

14. The method of claim 11, wherein the first plurality of entity datasets are received from a client computing device, and wherein the second plurality of entity datasets are retrieved from an entity repository of the computing system.

15. The method of claim 14, wherein the first plurality of entity datasets are structured according to a first data structure, and wherein the second plurality of entity datasets are structured according to a second data structure, and wherein the first data structure and the second data structure are different.

16. The method of claim 15, wherein the first data structure is a file data structure including a file field, a file classification field, and an entity name field, and wherein the second data structure is an entity data structure including a name field, an address field, and a national provider identifier (NPI) field.

* * * * *